United States Patent [19]
Harris

[11] Patent Number: 5,898,484
[45] Date of Patent: Apr. 27, 1999

[54] HAND-HELD DISTANCE-MEASUREMENT DEVICE WITH AN ENHANCED VIEWFINDER

[76] Inventor: Steven E. Harris, 324 Fullerton Ave., Newport Beach, Calif. 92663

[21] Appl. No.: 08/865,958

[22] Filed: May 30, 1997

[51] Int. Cl.$^6$ .............................. G01C 3/08; G01C 1/06
[52] U.S. Cl. .................. 356/4.01; 356/5.01; 356/138.1; 356/143
[58] Field of Search ................................ 356/4.01, 5.15, 356/138.1, 143, 5.01; 342/118, 146

[56] References Cited

U.S. PATENT DOCUMENTS

| | | |
|---|---|---|
| 3,409,768 | 11/1968 | Fernandez . |
| 3,545,861 | 12/1970 | Farnsworth et al. . |
| 3,574,461 | 4/1971 | Yurasek et al. . |
| 3,620,626 | 11/1971 | Daly et al. . |
| 3,650,628 | 3/1972 | Tawfik et al. . |
| 3,716,445 | 2/1973 | Lemelson . |
| 3,723,002 | 3/1973 | Everest . |
| 3,738,749 | 6/1973 | Everest et al. . |
| 3,752,581 | 8/1973 | Everest et al. . |
| 4,015,258 | 3/1977 | Smith et al. . |
| 4,091,412 | 5/1978 | Salonimer . |
| 4,108,551 | 8/1978 | Weber . |
| 4,346,989 | 8/1982 | Gort et al. . |
| 4,553,836 | 11/1985 | Meier et al. . |
| 4,569,599 | 2/1986 | Bökow et al. . |

(List continued on next page.)

FOREIGN PATENT DOCUMENTS

WO9530879   11/1995   WIPO .

OTHER PUBLICATIONS

Maintenance Manual, Pulseranger Electronic Distance Measuring Instrument, Keuffell & Esser, pp. 1–1 through 2–21.

Brochure—Tasco ProPoint III, Product Brochure, Tasco Sales, Inc., Miami, Florida, 1991.

Brochure—Tasco ProPoint III, Instruction Brochure, Tasco Sales, Inc., Miami, Florida, 1991.

Z.H. Meiksin and Philip C. Thackray, Electronic Design With–The–Self Integrated Circuits, Second Edition, Prentice–Hall, Inc. Business & Professional Division, Englewood Cliffs, New Jersey, pp. 341–346, 354–366.

1989 Linear Data Manual, vol. 2: Industrial, Signetics, 1988, pp. iii, iv, 5–1 through 5–10, and 5–24 through 5–36.

Kari Maatta, Juha Kostamovaara, and Risto Myllyla, Profiling of hot surfaces by pulsed time–of flight laser range finder techniques, Applied Optics, vol. 32, No. 27, Sep. 20, 1993, pp. 5334–5347.

Article—Putting Low–Voltage Analog ICs to Use, Electronic Design News, Sep. 2, 1993, pp. 106–107.

(List continued on next page.)

*Primary Examiner*—Stephen C. Buczinski
*Attorney, Agent, or Firm*—Knobbe, Martens, Olson & Bear LLP

[57] ABSTRACT

The present invention relates to a portable, hand-held distance-measurement apparatus comprising a laser range finder which is aimed by an active viewfinder. The active viewfinder improves the accuracy of the range finder by giving the user more visual feedback and thus allowing the user better control over the ranging operation. Under user command, the viewfinder enters a targeting mode wherein the user is presented with a illuminated targeting indicator inside the viewfinder. The indicator is superimposed upon the field-of-view seen through the viewfinder. In the targeting mode, the user aims the range finder by placing the targeting indicator on the object to be ranged. Once the device is aimed, the user commands the distance-measurement device to execute a distance measurement cycle. In one embodiment, targeting indicator flashes in various ways to indicate the quality of the data being obtained during the distance measurement cycle. When enough data has been obtained to compute the distance, then the targeting indicator turns off, letting the user know that the display has been updated.

28 Claims, 15 Drawing Sheets

U.S. PATENT DOCUMENTS

| | | |
|---|---|---|
| 4,699,508 | 10/1987 | Bökow et al. . |
| 4,861,159 | 8/1989 | Breen . |
| 4,888,477 | 12/1989 | Nankivil . |
| 4,895,441 | 1/1990 | Allen, Jr. . |
| 4,902,128 | 2/1990 | Siebecker et al. . |
| 4,975,889 | 12/1990 | Petrucelli et al. . |
| 5,046,839 | 9/1991 | Krangle . |
| 5,082,364 | 1/1992 | Russell . |
| 5,083,861 | 1/1992 | Chi . |
| 5,157,403 | 10/1992 | Urkowitz . |
| 5,171,624 | 12/1992 | Walter . |
| 5,221,956 | 6/1993 | Patterson et al. . |
| 5,311,271 | 5/1994 | Hurt et al. . |
| 5,359,404 | 10/1994 | Dunne . |
| 5,623,335 | 4/1997 | Bamberger ............................ 356/5.01 |

OTHER PUBLICATIONS

Brochure—2000X RetroReflective Targets, 3M Remote Sensing Systems, 3M Packaging Systems Division, St. Paul, Minnesota, 1987.

Brochure—Retro-Reflective Materials & Equipment for Automatic Control Systems, 3M Remote Sensing Systems, 3M Packaging Systems Division, St. Paul, Minnesota.

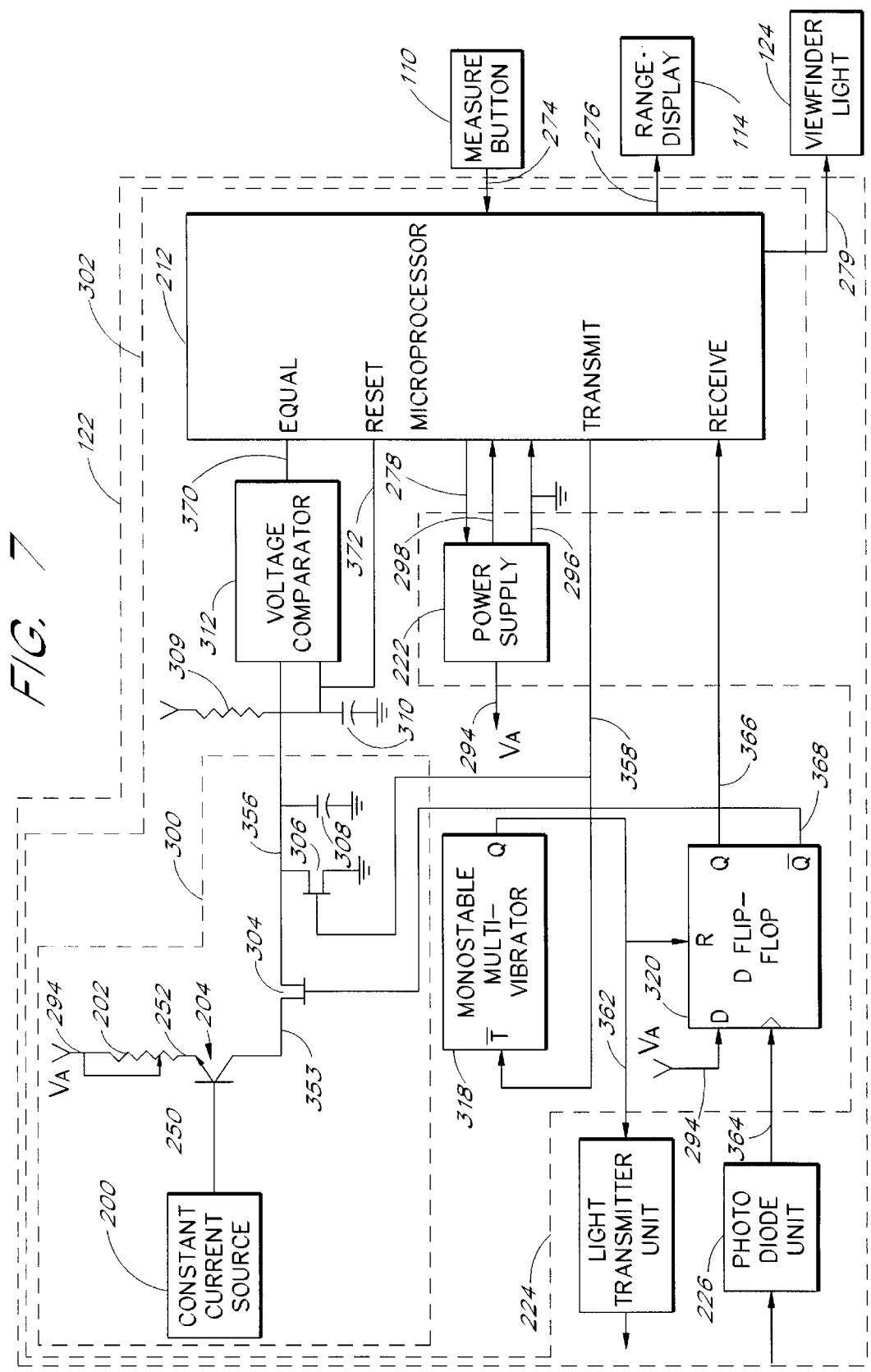

HAND-HELD DISTANCE-MEASUREMENT DEVICE WITH AN ENHANCED VIEWFINDER

BACKGROUND OF THE INVENTION

1. Field of the Invention

The present invention pertains to the field of laser range finding devices for measuring the distance between the device and a remote object or surface. In particular, the present invention pertains to portable, hand-held distance-measurement devices.

2. Background Information

There are several prior art distance-measurement systems that have utilized a laser range finder. These systems generally transmit a beam of light energy, receive a reflection of the light beam, and measure the difference in time between the transmission and reception of the light beam.

Most laser range finding systems utilize a high-speed clock to count the time lapse between the transmission and reception of light pulses. High-speed clocks and other high-speed components required to implement such a technique consume too much electrical energy for practical use in a portable, battery-operated range finder. Most of the prior art range finder systems cannot operate for an adequate period of time using conventional batteries that are small enough for truly portable use.

In addition, most of the prior art distance-measurement systems require that the light beam from the range finder be incident on the intended target for a specified minimum period of time. If the user of the range finder even slightly moves the range finder so that the light beam no longer contacts the intended target, the measurements obtained by the range finder are generally inaccurate. Thus, most distance-measurement systems require that the range finder be mounted on a steady and secure surface, which prevents their use in an application that calls for a hand-held device.

SUMMARY OF THE INVENTION

The present invention comprises a portable, hand-held distance-measurement apparatus. The distance-measurement apparatus comprises a light transmitter, a light receiver, a time measurement circuit, a power supply, and a processor. The light transmitter generates pulses of light for transmission to and reflection by a remote surface. The light receiver receives pulses of light that have reflected off the remote surface, and detects such reflected pulses of light. The time measurement circuit generates a digital value that represents an analog value, where the analog value is determinatively related to the elapsed time between the generation of one of the light pulses by the light transmitter and the detection of the one light pulse by the light receiver. The time measurement circuit comprises a charging capacitor, a current source, a charge/discharge circuit, a latch, a reference voltage generator, a comparator, and a digital value generator. The current source provides an electronic current to charge the charging capacitor. The charge/discharge circuit comprises one or more charge/discharge switches connected to control the charging and discharging of the charging capacitor. The charge/discharge circuit causes the charging capacitor to discharge before the generation of the transmitted light pulse and to begin charging substantially at a first predetermined time relative to the generation of the transmitted light pulse. The latch latches a first voltage representative of the charge across the charging capacitor substantially at a second predetermined time relative to the detection of the reflected light pulse. The reference voltage generator generates a reference voltage signal having a magnitude that varies over time. The comparator generates a compare signal corresponding to the relative magnitudes of the first voltage and the reference voltage signal. The digital value generator monitors the compare signal and, in response thereto, generates the digital value. The power supply provides electrical power to the time measurement circuit. The electrical power is disabled when the time measurement circuit is not in use. The processor receives the digital value from the time measurement circuit and, in response thereto, determines a distance measurement between the distance-measurement apparatus and the remote surface.

The present invention also comprises a method of performing a plurality of distance-measurement operations to determine distances between a distance-measurement apparatus and one or more remote surfaces. The method comprises the steps of detecting one or more requests for a distance-measurement operation and, for each detected request, performing a distance-measurement operation. The distance-measurement operation comprises the steps of performing a plurality of distance-measurement cycles to obtain a first plurality of digital values, discarding a second plurality of the first plurality of digital values, discarding a third plurality of the first plurality of digital values, computing an average digital value from a fourth plurality of digital values, and obtaining a corresponding distance-measurement value from the average digital value. The distance-measurement value represents the distance between the distance-measurement apparatus and the remote surface. Each distance-measurement cycle comprises the steps of generating a light pulse and directing the light pulse toward a remote surface for reflection from the surface as a reflected light pulse, receiving the reflected light pulse, and generating a digital value that represents an analog value that is determinatively related to the elapsed time between the generation of the light pulse and the reception of the reflected light pulse. The second plurality of digital values comprises the lowest of the digital values. The third plurality of digital values comprises the highest of the digital values. The fourth plurality of digital values comprises all of the first plurality of digital values that have not been discarded.

The present invention also comprises a distance-measurement system. The distance-measurement system comprises a reflective target and a portable, hand-held distance-measurement apparatus. The reflective target comprises a sheet of reflective material. The reflective target has a reflectivity that is at least 1000 times greater than the reflectivity of a Lambertian surface for substantially all horizontal entrance angles. The distance-measurement apparatus comprises a light transmitter, a light receiver, a time measurement circuit, a digital value generator, and a processor. The light transmitter generates a pulse of light and directs the pulse of light toward the reflective target for reflection as a reflected pulse of light. The light receiver receives the reflected pulse of light. The time measurement circuit measures the elapsed time between the generation of the light pulse by the light transmitter and the reception of the reflected light pulse by the light receiver. The digital value generator generates a digital value that represents an analog value that is determinatively related to the elapsed time. The processor receives the digital value and, in response thereto, computes the distance between the distance-measurement apparatus and the reflective target.

The present invention also comprises a portable, hand-held distance-measurement apparatus. The distance-measurement apparatus comprises a light transmitter, a light receiver, a time measurement circuit, a digital value generator, a power supply, a processor, and a view finding device called the viewfinder. The light transmitter generates a pulse of light for reflection off a remote surface as a reflected pulse of light. The light receiver receives the reflected pulse of light. The time measurement circuit measures the elapsed time between the generation of the light pulse by the light transmitter and the reception of the reflected light pulse by the light receiver. The digital value generator generates a digital value that represents an analog value that is substantially proportional to the elapsed time. The power supply provides electrical power to the time measurement circuit. The electrical power is disabled when the time measurement circuit is not in use. The processor receives the digital value from the time measurement circuit and, in response thereto, computes a distance measurement between the distance-measurement apparatus and the remote surface. The viewfinder facilitates aiming the pulse of light toward the remote surface.

The present invention also comprises a portable, hand-held distance-measurement apparatus with an enhanced viewfinding system. The enhanced viewfinding system significantly improves the accuracy and reliability of the distance measurements by providing more visual feedback to the user than prior systems. The distance-measurement apparatus comprises a light transmitter, a light receiver, a time measurement circuit, a digital value generator, a power supply, a processor, and an enhanced viewfinding system. The enhanced viewfinding system helps the user aim the pulse of light toward the remote surface by providing an illuminated aiming aid and a method for using the illuminating aid. The illuminated aiming aid is turned on when the user presses a button on the outside of the apparatus. When the user releases the button, then the apparatus begins measuring the distance to the remote object by using pulses of light. The light transmitter generates a pulse of light for reflection off a remote surface as a reflected pulse of light. The light receiver receives the reflected pulse of light. The time measurement circuit measures the elapsed time between the generation of the light pulse by the light transmitter and the reception of the reflected light pulse by the light receiver. The processor receives a digital value from the time measurement circuit and, in response thereto, computes a distance measurement between the distance-measurement apparatus and the remote surface. Once the display has been updated, then the illuminated aiming aid is turned off so that the user knows that the measurement is complete. In an alternate embodiment, the illuminated aiming aid flashes during the measurement period in a manner that tells the user of the quality and quantity of data being received. Electrical power to the time measurement circuit is disabled when the time measurement circuit is not in use.

BRIEF DESCRIPTION OF THE DRAWINGS

FIG. 7 is a functional block diagram of a second embodiment of an electronic unit of the distance-measurement apparatus.

DETAILED DESCRIPTION OF THE PREFERRED EMBODIMENT

Figure 1:
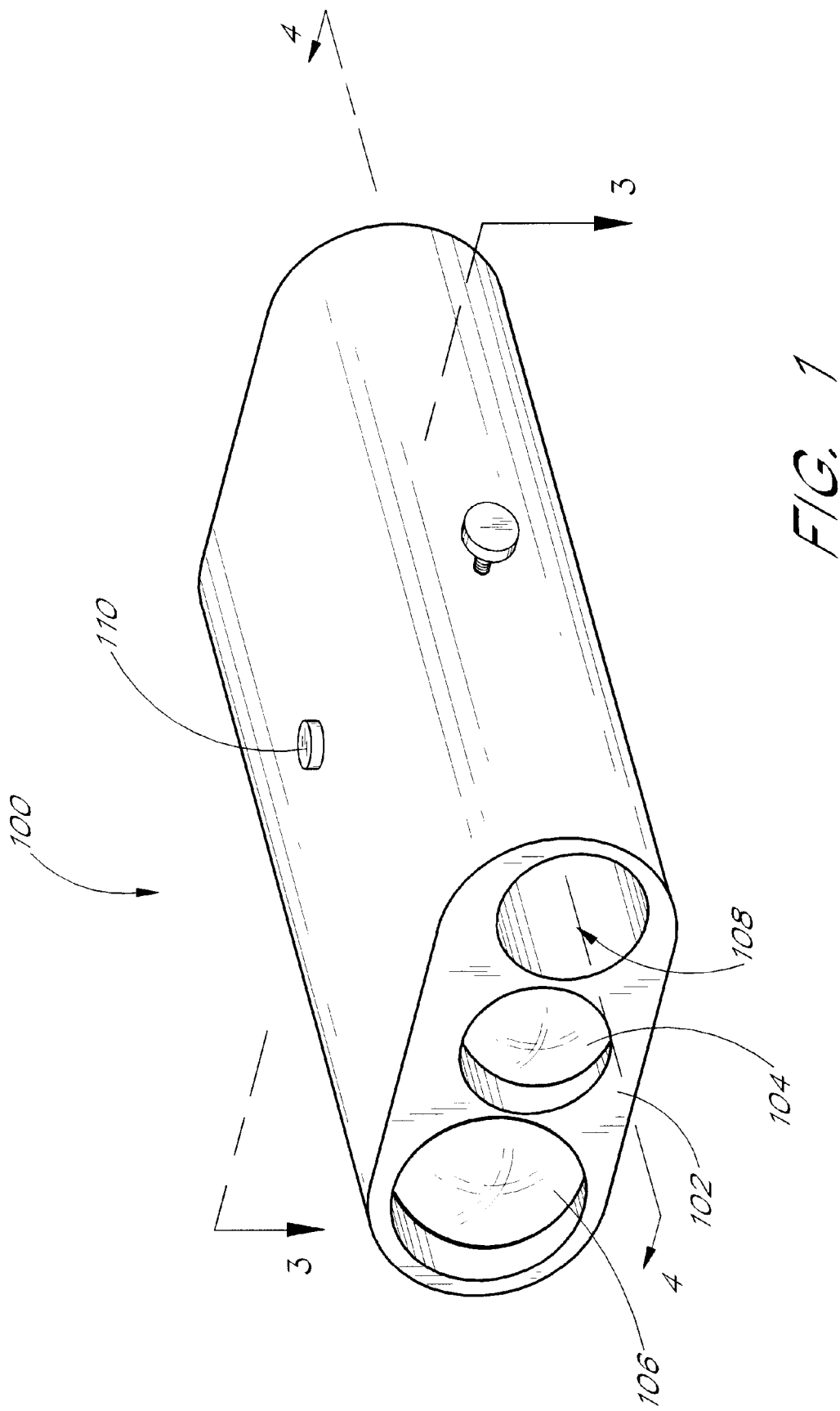
FIG. 1 is a perspective view of the distance-measurement apparatus, showing an end of the apparatus which, in use, is directed away from the user.

As illustrated in FIG. 1, a distance-measurement apparatus 100 comprises an operational end 102, a transmit lens 104, a receive lens 106, a superimposed light beam viewfinder 108, and a measure button 110.

Figure 2:
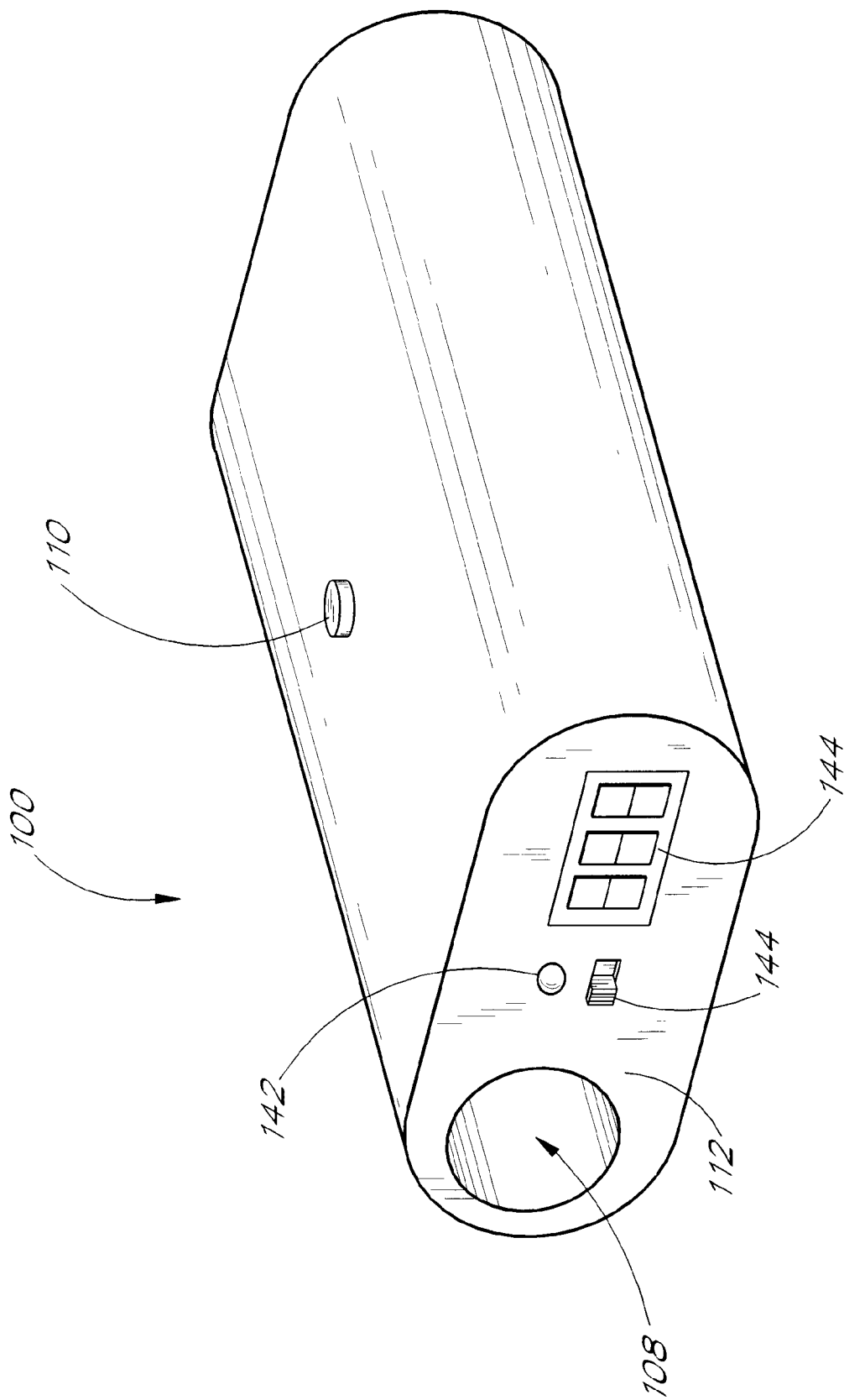
FIG. 2 is a perspective view of the distance-measurement apparatus, showing an end of the apparatus which, in use, is directed towards the user.

As illustrated in FIG. 2, the distance-measurement apparatus 100 further comprises a user end 112, a range display 114, a low battery indicator 142, and a viewfinder switch 144. FIG. 2 also illustrates the viewfinder 108 and the measure button 110.

Figure 3:
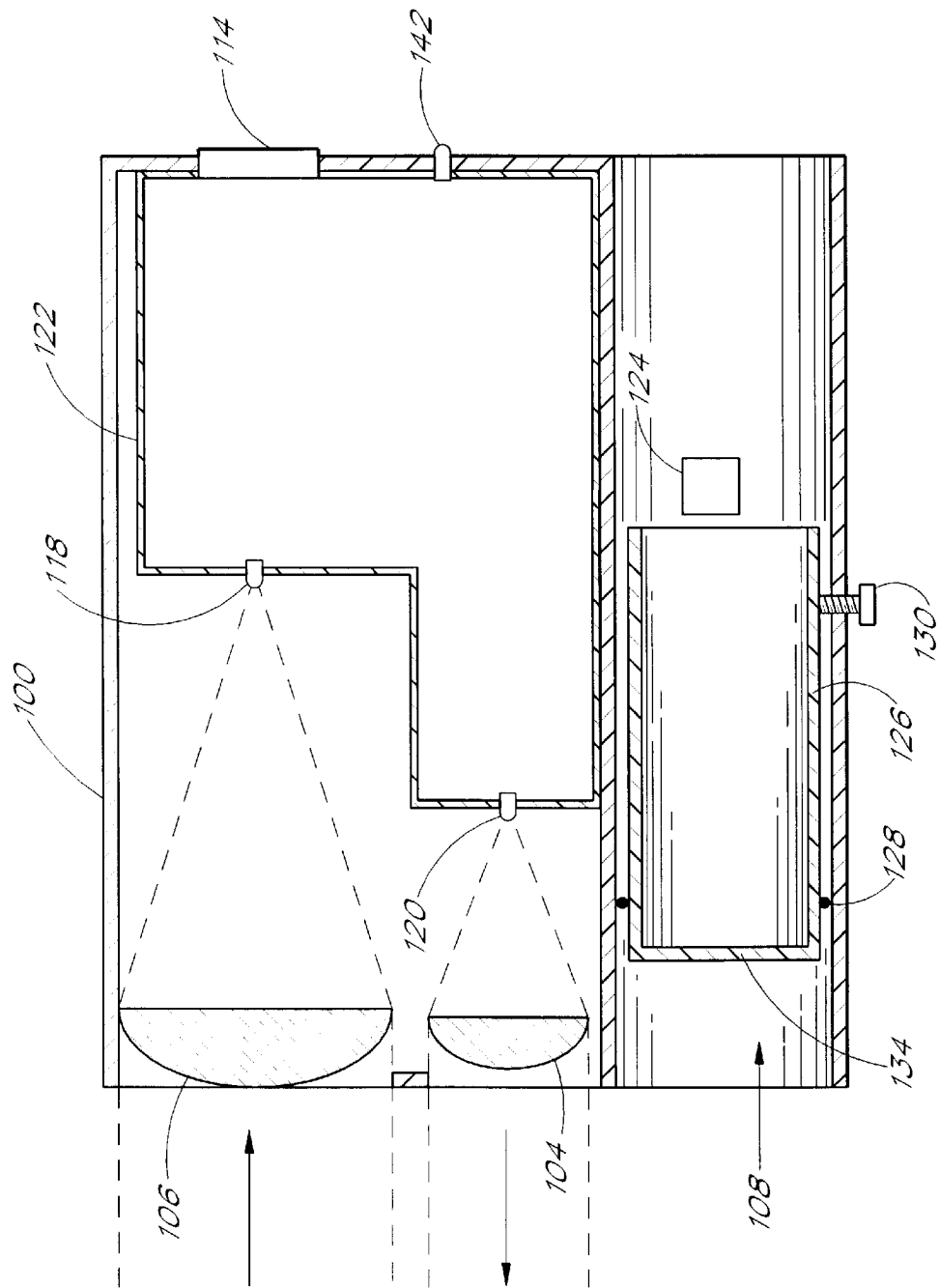
FIG. 3 is a cross-sectional view of the distance-measurement apparatus taken along the lines 3—3 of FIG. 1.

As illustrated in FIG. 3, the distance-measurement apparatus 100 further comprises a photodiode receiver 118, a laser diode 120, and an electronic unit 122. FIG. 3 also illustrates the transmit lens 104, the receive lens 106, the viewfinder 108, the range display 114, and the low battery indicator 142. As illustrated in FIG. 3, the viewfinder 108 comprises a viewfinder light 124, a reflector/window tube 126, a pivot O-ring 128, an X-axis adjustment screw 130, and a reflector/window 134.

Figure 4:
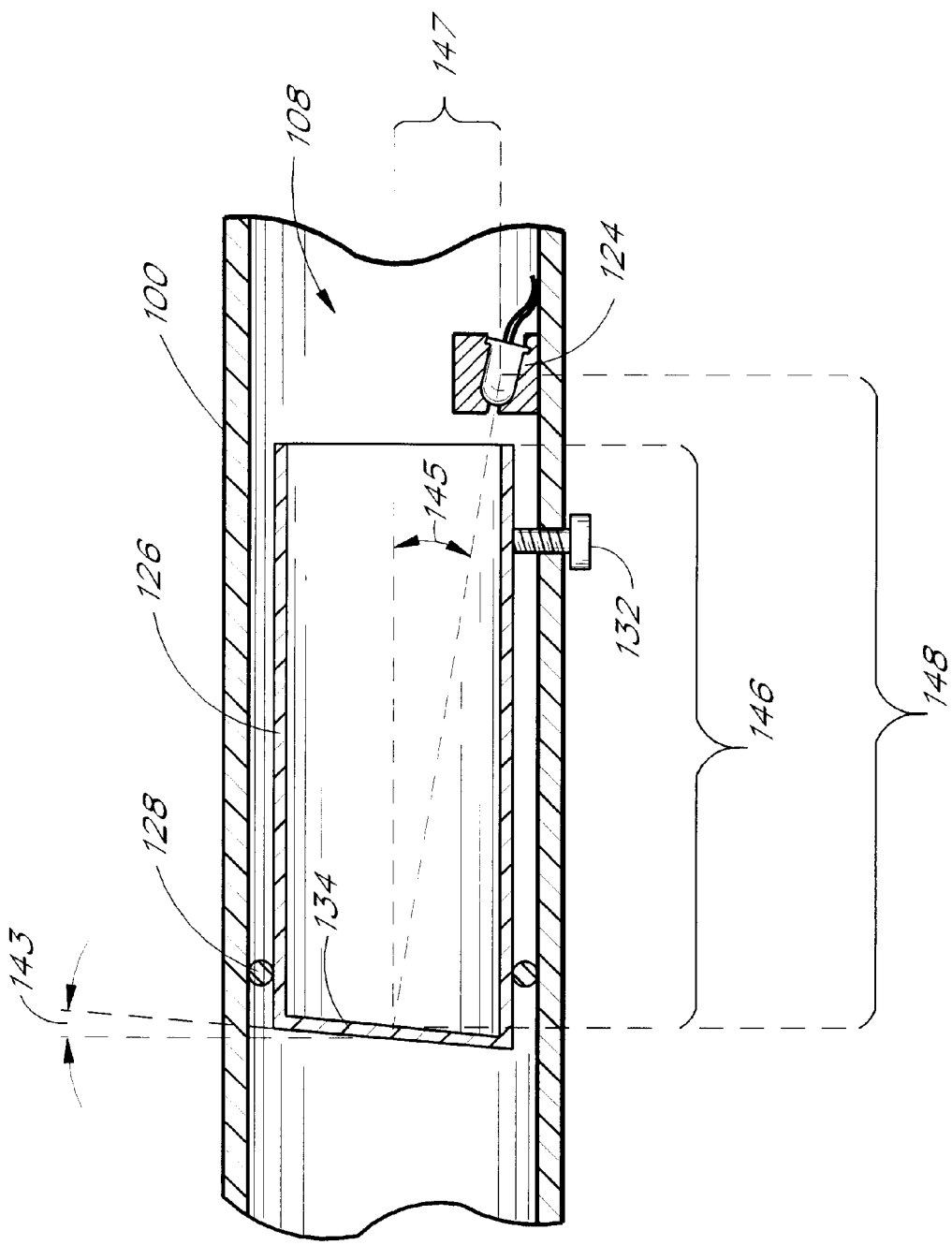
FIG. 4 is a cross-sectional view of the viewfinder taken along the lines 4—4 of FIG. 1.

As illustrated in FIG. 4, the viewfinder 108 further comprises a Y-axis adjustment screw 132. FIG. 4 also illustrates the viewfinder light 124, the reflector/window tube 126, the pivot O-ring 128, and the reflector/window 134.

Figure 5:
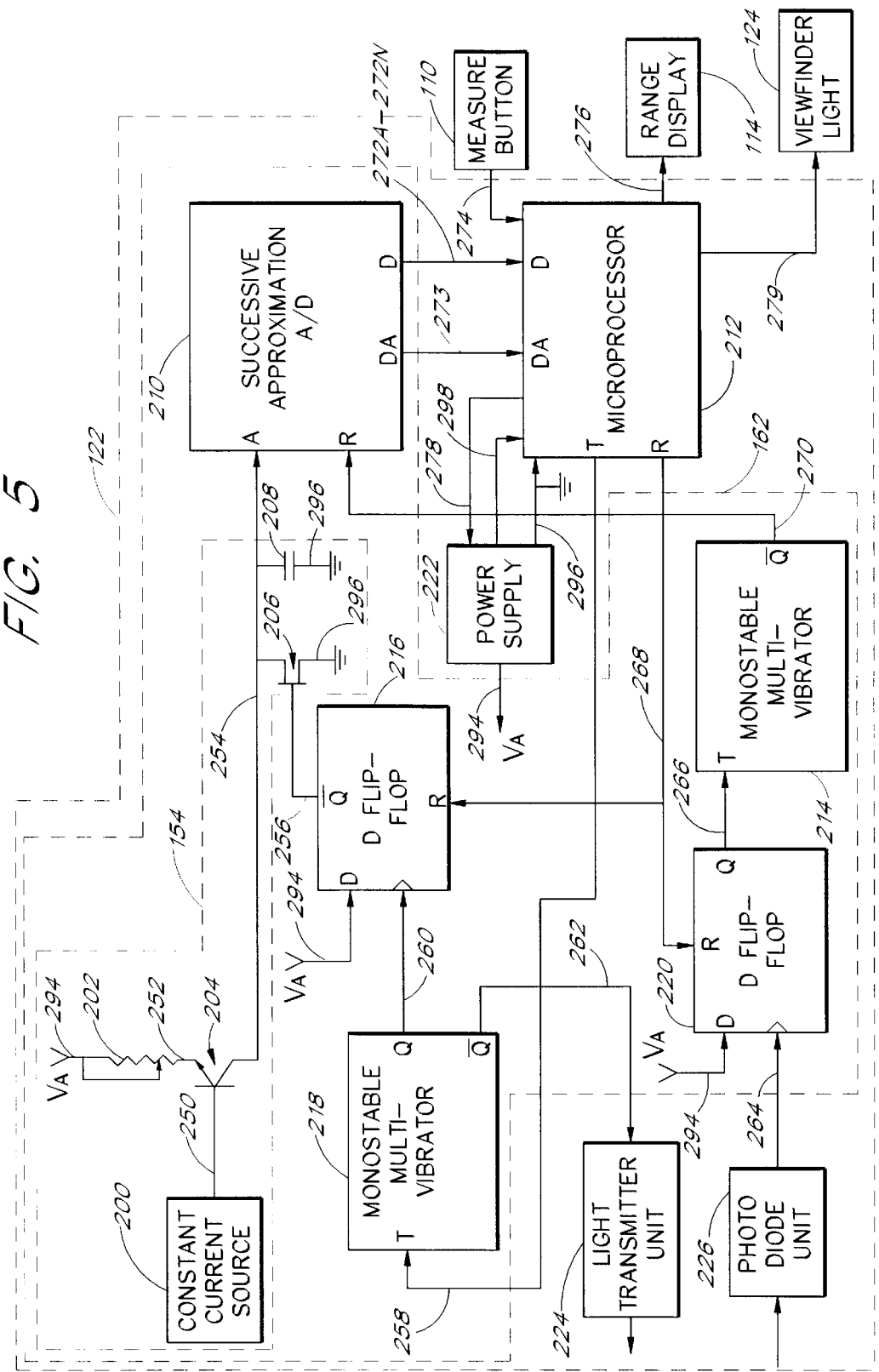
FIG. 5 is a functional block diagram of a first embodiment of an electronic unit of the distance-measurement apparatus.

As shown in FIG. 5, a first embodiment of the electronic unit 122 comprises a time-measurement circuit 162, a light transmitter unit 224, a photodiode unit 226, a microprocessor 212, and a power supply 222. The time-measurement circuit 162 comprises a ramp generator 154, a successive approximation analog-to-digital converter (S/A A/D) 210, a monostable multivibrator 214, a D flip-flop 216, a monostable multivibrator 218, and a D flip-flop 220. The ramp generator 154 comprises a constant current source 200, a charge rate selection resistor 202, a constant current transistor 204, a charge/discharge switch 206, and a charging capacitor 208. In the preferred embodiment, the electronic unit 122 comprises a number of components that have relatively low power consumption. For example, the D flip-flops 216 and 220 and the monostable multivibrators 214 and 218 are preferably CMOS type components. FIG. 5 also illustrates the measure button 110 and the range display 114.

A first terminal of the charge rate selection resistor 202 is connected to the power supply 222 by an analog power line 294. The analog power line 294 is also connected to the constant current source 200, the S/A A/D 210, the monostable multivibrator 214, the D flip-flop 216, the monostable multivibrator 218, the D flip-flop 220, the light transmitter unit 224, and the photodiode unit 226 to provide power to these components, although, to simplify the drawing, these connections are not illustrated in FIG. 5. A second terminal of the charge rate selection resistor 202 is connected to an emitter terminal of the constant current transistor 204 by a charge rate line 252. The constant current source 200 is connected to a base terminal of the constant current transistor 204 by a constant current line 250. A collector terminal of the constant current transistor 204 is connected to a drain terminal of the charge/discharge switch 206, to a positive terminal of the charging capacitor 208, and to an analog input of the S/A A/D 210 by a ramp voltage line 254. A source terminal of the charge/discharge switch 206 is connected to the power supply 222 by a ground line 296. A negative terminal of the charging capacitor 208 is also connected to the ground line 296. In addition, the ground line 296 is connected to the constant current source 200, the S/A A/D 210, the microprocessor 212, the monostable multivibrator 214, the D flip-flop 216, the monostable multivibrator 218, the D flip-flop 220, the light transmitter unit 224, and the photodiode unit 226. A gate terminal of the charge/discharge switch 206 is connected to an inverted output of the D flip-flop 216 by a charge/discharge line 256. A clock input of the D flip-flop 216 is connected to an active high output of the monostable multivibrator 218 by a charge line 260, while a D input of the D flip-flop 216 is connected to the analog power line 294. An inverted output of the monostable multivibrator 218 is connected to the light transmitter unit 224 by a transmit pulse line 262. A reset input of the D flip-flop 216 is connected to a reset input of the D flip-flop 220 and to a reset output of the microprocessor 212 by a reset analog line 268. A trigger input of the monostable multivibrator 218 is connected to a trigger output of the microprocessor 212 by a trigger line 258. A clock input of the D flip-flop 220 is connected to the photodiode unit 226 by a receive pulse line 264, while a D input of the D flip-flop 220 is connected to the analog power line 294. An active high output of the D flip-flop 220 is connected to a trigger input of the monostable multivibrator 214 by a receive detection line 266. An inverted output of the monostable multivibrator 214 is connected to a read input of the S/A A/D 210 by a read A/D line 270. A set of digital data outputs of the S/A A/D 210 is connected to a set of digital data inputs of the microprocessor 212 by a set of digital data lines 272A–272N. A data available output of the S/A A/D 210 is connected to a data available input of the microprocessor 212 by a data available line 273. An analog power control output of the microprocessor 212 is connected to the power supply 222 by an analog power control line 278. A power input of the microprocessor 212 is connected to the power supply 222 by a microprocessor power line 298. An interrupt input of the microprocessor 212 is connected to the measure button 110 by a measure line 274. A set of display outputs of the microprocessor 212 is connected to the range display 114 by a range display bus 276. An output of the microprocessor 212 is connected to the viewfinder light 124 by a control line 279.

The light transmitter unit 224 preferably comprises the laser diode 120 (shown in FIG. 3), although other light transmitter devices can also be used. The light transmitter unit 224 also preferably comprises a laser driver (not shown) for driving the laser diode 120 with a desired voltage and current. The desired voltage and current depends on the particular application involved. The photodiode unit 226 preferably comprises the photodiode receiver 118 (shown in FIG. 3), a transimpedance amplifier (not shown), a video amplifier (not shown), and a comparator (not shown).

Figure 6:
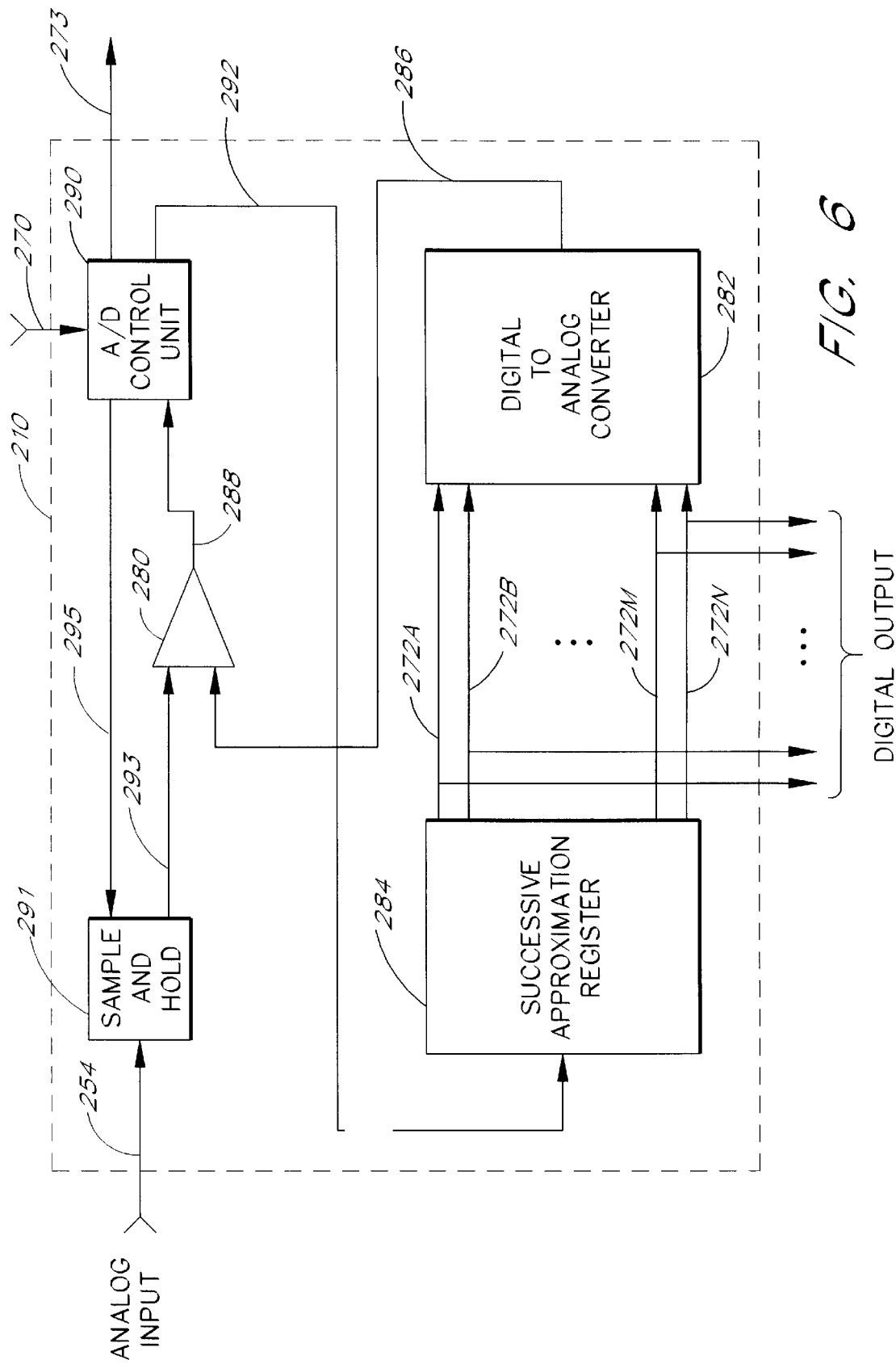
FIG. 6 is a functional block diagram of a successive approximation analog-to-digital converter of the electronic unit of FIG. 5.

As shown in FIG. 6, the successive approximation analog-to-digital converter 210 of FIG. 5 comprises a comparator 280, a digital-to-analog converter (D/A) 282, a successive approximation register 284, an A/D control unit 290, and a sample and hold latch 291. The ramp voltage line 254 is connected to an analog data input of the sample and hold latch 291. An analog data output of the sample and hold latch 291 is connected to a first compare input of the comparator 280 by a sampled analog voltage line 293. A reference voltage line 286 is connected between an analog output of the D/A 282 and a second compare input of the comparator 280. A compare line 288 is connected between a compare output of the comparator 280 and a compare input of the A/D control unit 290. A sample line 295 is connected between the A/D control unit 290 and the sample and hold latch 291. The read A/D line 270 is connected to a read input of the A/D control unit 290. A successive approximation register control bus 292 is connected between the A/D control unit 290 and the successive approximation register 284. The digital data lines 272A–272N are connected between a set of data outputs of the successive approximation register 284 and a set of digital data inputs of the D/A 282. The data available line 273 is connected to a data available output of the A/D control unit 290.

The latch 291 is an important element of the electronic unit 122 of the preferred embodiment. The latch 291 stores the analog voltage that has accumulated across the charging capacitor 208 at approximately the time that the reflected light pulse is received at the photodiode receiver 118. The analog storage of this voltage allows the S/A A/D 210 to determine a digital representation of the analog voltage over a relatively large period of time. For example, in the preferred embodiment, the S/A A/D 210 takes approximately 25 microseconds to generate a digital value. This relatively slow analog to digital conversion time can be achieved by a S/A A/D 210 that has low power consumption. For example, the S/A A/D 210 of the preferred embodiment is a CMOS component that requires a current in the range of microamperes. Preferably, the S/A A/D 210 has a 12 bit resolution.

As shown in FIG. 7, a second embodiment of the electronic unit 122 comprises a time-measurement circuit 302, the light transmitter unit 224, the photodiode unit 226, and the power supply 222. The time-measurement circuit 302 comprises a ramp generator 300, the microprocessor 212, a monostable multivibrator 318, a D flip-flop 320, a slow-charge resistor 309, a slow-charge capacitor 310, and a voltage comparator 312. The ramp generator 300 comprises the constant current source 200, the charge rate selection resistor 202, the constant current transistor 204, a charge switch 304, a discharge switch 306, and a charging capacitor 308. Again, in the preferred embodiment, the electronic unit 122 comprises a number of components that have relatively low power consumption. FIG. 7 also illustrates the measure button 110, the viewfinder light 124, and the range display 114.

The first terminal of the charge rate selection resistor 202 is connected to the power supply 222 by the analog power line 294. The analog power line 294 is also connected to the constant current source 200, the monostable multivibrator 318, the D flip-flop 320, the light transmitter unit 224, and the photodiode unit 226 to provide power to these components, although these connections are not illustrated in FIG. 7. The second terminal of the charge rate selection resistor 202 is connected to the emitter terminal of the constant current transistor 204 by the charge rate line 252. The constant current source 200 is connected to the base terminal of the constant current transistor 204 by the constant current line 250. The collector terminal of the constant current transistor 204 is connected to a drain terminal of the charge switch 304 by a constant current line 353. A collector terminal of the charge switch 304 is connected to a drain terminal of the discharge switch 306, to a positive terminal of the charging capacitor 308, and to a first input of the voltage comparator 312 by a ramp voltage line 356. A source terminal of the discharge switch 306 is connected to the power supply 222 by the ground line 296. A negative terminal of the charging capacitor 308 and a negative terminal of the slow-charge capacitor 310 are also connected to the ground line 296. In addition, the ground line 296 is connected to the constant current source 200, the microprocessor 212, the monostable multivibrator 318, the D flip-flop 320, the light transmitter unit 224, and the photodiode unit 226. A gate terminal of the charge switch 304 is connected to an inverted output of the D flip-flop 320 by a charge line 368. A gate terminal of the discharge switch 306 is connected to a transmit output of the microprocessor 212 and to an active low trigger input of the monostable multivibrator 318 by a discharge/trigger line 358. An active high output of the monostable multivibrator 318 is connected to the light transmitter unit 224 and to a reset input of the D flip-flop 320 by a transmit pulse line 362. A clock input of the D flip-flop 320 is connected to the photodiode unit 226 by a receive pulse line 364, while a D input of the D flip-flop 320 is connected to the analog power line 294. An active high output of the D flip-flop 320 is connected to a receive input of the microprocessor 212 by a receive detection line 366. A first terminal of the slow-charge resistor 309 is connected to the analog power line 294. A second terminal of the slow-charge resistor 309 is connected to a positive terminal of the slow-charge capacitor 310, to a second input of the comparator 312, and to a reset output of the microprocessor 212 by a ramp voltage line 372. An output of the voltage comparator 312 is connected to an equal input of the microprocessor 212 by a compare-equal line 370. The analog power control output of the microprocessor 212 is connected to the power supply 222 by the analog power control line 278. The power input of the microprocessor 212 is connected to the power supply 222 by the microprocessor power line 298. An interrupt input of the microprocessor 212 is connected to the measure button 110 by the measure line 274. The set of display outputs of the microprocessor 212 is connected to the range display 114 by the range display bus 276.

The charging capacitor 308 of the second embodiment of the electronic unit 122 comprises both a charging device and a latching device. Thus, the charging capacitor 308 serves the same general purpose as both the charging capacitor 208 and the latch 291 serve in the first embodiment of the electronic unit 122. Generally, the charging capacitor 308 and the charging capacitor 208 each accumulate a charge to provide a ramp voltage, and the charging capacitor 308 and the latch 291 each latch the accumulated voltage at approximately the time that the reflected light pulse is received at the photodiode receiver 118. Similar to the first embodiment, in the second embodiment, the analog storage of the ramp voltage allows the slow-charge resistor 309, the slow-charge capacitor 310, the voltage comparator 312, and the microprocessor 212 to determine a digital representation of the analog voltage over a relatively large period of time. Without the analog storage, a much faster analog-to-digital conversion technique would be required, causing increased power consumption. Referring generally to FIGS. 1 to 7, the laser 120 of the distance-measurement apparatus 100 generates a beam of light that is emitted from the transmit lens 104. The light travels away from the distance-measurement apparatus 100 in a direction that is substantially perpendicular to the operational end 102. If there is an object or surface in front (toward the operational end 102) of the distance-measurement apparatus 100, a portion of the light is typically reflected back toward the distance-measurement apparatus 100. Some of the reflected light that reaches the receive lens 106 is focused onto the photo-diode receiver 118, which generates an electronic signal in response to the quantity of incident light within the operating range of the photo-diode receiver 118.

The electronic unit 122 controls the laser 120 to generate the light pulse. The electronic unit 122 then determines the time between the transmitted light pulse and a received light pulse at the photo-diode receiver 118. This time calculation represents the time required for the light to travel from the distance-measurement apparatus 100 to the remote object or surface, and back. Based on the speed of light and the calculated travel time, the electronic unit 122 calculates the distance between the distance-measurement apparatus 100 and the remote object or surface.

In the preferred embodiment of the present invention, the electronic unit 122 executes a number of distance-measurement cycles to calculate a single distance value. A distance-measurement cycle is a process comprising the steps of generating a transmit light pulse, waiting for a receive light pulse, and, if a receive light pulse is detected, calculating the distance represented by the time delay between the transmit pulse and the receive pulse. If a receive light pulse is not detected within a predetermined period of time after generating a transmit pulse, the distance-measurement cycle is terminated with no resulting data value.

In the preferred embodiment, the electronic unit 122 continues to execute distance-measurement cycles until a predetermined number of data values has been obtained. The electronic unit 122 then discards a number of the data values with the highest numerical values and a number of the data values with the lowest numerical values, and determines the average of the remaining data values. In the preferred embodiment, the distance-measurement apparatus 100 computes the distance between the distance-measurement apparatus 100 and the remote object or surface with an accuracy of approximately 0.5 yards. However, in some applications, such as golf, the distance may be indicated on the range display 114 only to the nearest yard. In one preferable embodiment, for example, distance-measurement cycles may be repeatedly executed until 64 data values have been obtained. Then, the lowest 16 data values and the highest 16 data values are discarded. The remaining 32 data values are averaged to determine the distance to the remote object or surface.

The distance-measurement apparatus 100 of the present invention is particularly useful as a portable, hand-held distance-measurement device. In particular, the distance-measurement apparatus 100 can obtain accurate distance measurements without the assistance of a tripod or other secure foundation. In most prior art distance-measurement devices, such a secure foundation is required to ensure that the transmitted pulse consistently reflects off the desired object or surface. However, with the distance-measurement apparatus 100 of the present invention, the user need not continuously maintain the direction of the transmitted light beam toward the desired object or surface. If the user does not continuously hit the desired target with the light beam, the light beam may occasionally fail to hit any surface, so that it is not reflected back to the distance-measurement apparatus 100 at all. This occurrence is termed a "miss". Alternatively, the light pulse may be reflected back to the distance-measurement apparatus 100 by contact with an incorrect object or surface. This occurrence is termed an "incorrect hit". If the light beam is reflected back to the distance-measurement apparatus 100 by reflection off the desired object or surface, a "correct hit" occurs. Of course, the light beam may also hit an object or surface at an angle or position so that insufficient light is reflected for detection at the distance-measurement apparatus 100. Such an occurrence is considered a miss. The present description assumes either that a light beam hits an object or surface so that sufficient light is reflected for detection, or the light beam completely misses the object or surface.

If a miss occurs, no receive pulse is detected at the distance-measurement apparatus 100, no data value is obtained, and the distance-measurement cycle is ignored. In this situation, the distance-measurement operation continues until the user correctly aims the light beam at the desired object or surface. Thus, an occurrence of a miss does not affect the distance-measurement operation, except for delaying the operation until the user correctly aims the light beam at the desired object or surface.

If an incorrect hit occurs, the data value obtained by the distance-measurement apparatus 100 is likely to be inaccurate, as the object or surface that is hit may be closer or further than the desired object or surface. However, as described above, the distance-measurement apparatus 100 discards the highest and the lowest data values before taking an average of the remaining data values. Thus, as long as the user is generally able to aim the light beam toward the desired object or surface, data values obtained by incorrect hits are likely to be discarded as the highest or the lowest data values. Thus, incorrect hits generally have no effect on the distance-measurement operation. In addition, the discarding of the highest and lowest data values, and the averaging of the remaining data values also reduces the effect of noise on the distance-measurement operation.

The number of data values obtained and the number of minimum and maximum values that are discarded can be varied for various applications and circumstances. Generally, in situations in which incorrect hits are more likely to occur, the number of data values that are discarded should be increased. Alternatively, the distance-measurement apparatus 100 of the present invention may also be used in conjunction with a secure foundation. In this situation, the number of discarded data values can generally be decreased.

The distance-measurement apparatus 100 of the present invention also has several power conservation features that further facilitate portable, hand-held operation. First, the distance-measurement apparatus 100 utilizes a ramped voltage and analog-to-digital conversion, instead of a high frequency clock, to determine the time of flight of the light pulse. A high frequency clock circuit requires substantially more electrical energy than the present invention. Second, the design uses low power components such as CMOS components and a relatively slow analog-to-digital conversion technique. Third, the distance-measurement apparatus 100 powers down most of the electronic circuitry in the electronic unit 122, whenever practicable, to reduce power consumption. Fourth, the microprocessor 212 enters a sleep mode, whenever practicable, to further reduce power consumption. These power saving features conserve battery life, so that a relatively small and lightweight battery provides sufficient electrical energy to power the distance-measurement apparatus 100 for a useful period of time. In the preferred embodiment, the distance-measurement apparatus 100 requires approximately 100 milliamperes of current for a time period between approximately 20 milliseconds and approximately 160 milliseconds (depending on the distance to be measured) when performing a distance-measurement cycle, and approximately 50 microamperes when the distance-measurement apparatus 100 is inactive. In the preferred embodiment of the present invention, the power supply 222 comprises a common 9-volt battery.

The microprocessor 212 controls the electronic unit 122 to perform distance-measurement operations. Referring to FIG. 5 and the first embodiment of the electronic unit 122, the microprocessor 212 receives power and ground signals from the power supply 222. The power and ground signals are provided to the microprocessor 212 on the microprocessor power line 298 and the ground line 296, respectively. The power supply 222 also provides power and ground signals to the remaining components in the electronic unit 122 on the analog power line 294 and the ground line 296, respectively. The supply of power on the analog power line 294 can be controlled by the microprocessor 212 by controlling a signal on the analog power control line 278.

The microprocessor 212 begins a distance-measurement cycle by generating a reset pulse on the reset analog line 268. The reset pulse is received by the D flip-flops 216 and 220, and the D flip-flops 216 and 220 are reset so that their active high outputs are at a logic zero. The resetting of the D flip-flop 220 enables the D flip-flop 220 to detect a receive pulse from the photo-diode unit 226. The resetting of the D flip-flop 216 causes a logic one signal at the inverted output of the D flip-flop 216. This logic one signal is applied to the gate terminal of the charge/discharge switch 206, which closes the switch 206 and effectively connects the ramp voltage line 254 to the ground line 296. This causes the charging capacitor 208 to discharge any previously accumulated charge to ground through the switch 206. The constant current source 200 generates a substantially constant current on the constant current line 250 that flows into the base terminal of the constant current transistor 204. The constant current at the base terminal of the constant current transistor 204 produces a current at the collector terminal of the constant current transistor 204 that flows away from the constant current transistor 204. However, while the switch 206 is closed, the current from the collector terminal of the constant current transistor 204 does not cause the charging capacitor 208 to charge because the current from the constant current transistor 204 also goes directly to ground through the switch 206. The D flip-flop 216 is ready for a transmit pulse from the monostable multivibrator 218.

After delaying a sufficient amount of time to allow the charging capacitor 208 to discharge any accumulated voltage, the microprocessor 212 generates a trigger pulse on the trigger line 258. The monostable multivibrator 218 receives the trigger pulse and generates a logic high pulse on its active high output and a logic low pulse on its inverted output, at approximately the same time. The D flip-flop 216 receives the logic high pulse at its clock input. This causes the D flip-flop 216 to become set to a logic one, as the D input is tied to the analog power line 294. The setting of the D flip-flop 216 generates a logic zero on the charge/discharge line 256, which opens the charge/discharge switch 206.

When the switch 206 is open, current from the constant current source 200 flows through the constant current transistor 204 to the charging capacitor 208. The charge rate selection resistor 202 is a variable resistor that controls the magnitude of current that is applied to the charging capacitor 208. The resistor 202 can be adjusted to apply a current to the charging capacitor 208 that is appropriate for the application for which the distance-measurement apparatus 100 is to be used. An appropriate current magnitude depends on the maximum distance for which a measurement is desired, the maximum voltage that can be converted to digital format by the S/A A/D 210, and the capacitance of the charging capacitor 208. For a golf application, a preferred maximum distance is about 300 yards. This corresponds to a maximum round trip travel time for a light pulse of approximately 1.8 micro-seconds. In this application, a maximum analog input voltage for the S/A A/D 210 is preferably 2.5 volts, the capacitance of the capacitor 208 is preferably 500 picofarads, and the charging current is preferably approximately 1 milliampere. Preferably, the current supplied to the charging capacitor 208 is substantially constant, so that the capacitor 208 charges in a substantially linear manner. The linear charging of the capacitor 208 reduces the complexity of the equation that must be implemented in the microprocessor 212 to convert a measured voltage into a corresponding physical distance, and it reduces the magnitude of error introduced into the measurement. The charge/discharge switch 206 remains open until the microprocessor 212 generates another reset pulse on the reset analog line 268.

The light transmitter unit 224 receives the logic zero pulse generated by the monostable multivibrator 218 on the transmit pulse line 262, and generates a pulse of light. As illustrated in FIG. 3, the light pulse from the laser diode 120 is directed toward an inner surface of the transmit lens 104. The light energy diverges between the laser diode 120 and the transmit lens 104. The transmit lens 104 redirects the light energy into a substantially parallel beam of radiation. This beam of radiation is emitted from an outer surface of the transmit lens 104 in a direction that is substantially perpendicular to the operational end 102.

The optical characteristics of the distance-measurement apparatus 100 are preferably designed for use in a particular application. The distances of interest in the application and the particular type or types of objects or surfaces to which distances are to be measured are considered. In particular, the effective reflective size and the overall reflectivity of the intended objects and surfaces are important. The effective reflective size of an object or surface is the surface area of the object or surface that generally reflects incident light back in the direction from which it arrived. Some objects, such as a sphere, may be relatively large, but have a relatively small effective size. When the light beam is directed toward a sphere, only a relatively small surface area of the sphere reflects light back toward the distance-measurement apparatus 100, while other areas of the sphere direct light in different directions. Thus, the effective reflective size of the sphere is limited to the relatively small surface area that reflects light back toward the distance-measurement apparatus 100. The reflectivity of an object or surface is a measure of the amount of incident light that is reflected back in the opposite direction from which the light arrived. The reflectivity of an object or surface may depend on the incident angle and location of the light on the object or surface.

The optical characteristics of the distance-measurement apparatus 100 include the characteristics of the optical components related to the transmission of light and the characteristics of the optical components related to the reception of light. These optical characteristics are selected to complement the optical characteristics of the intended objects or surfaces and the distances of interest in the particular application. For the transmission of light, the type of laser 120, the distance between the laser 120 and the transmit lens 104, and the size and optical characteristics of the transmit lens 104 are selected to maximize the amount of light that is reflected from the objects or surfaces for which distance measurements are desired, based on the expected distances to be measured and on the effective reflective size of the intended objects or surfaces. The amount of light energy generated at the laser 120 is controlled to obtain sufficient light reflection at the intended objects or surfaces, while also achieving adequate eye safety restrictions. For effectively larger objects or surfaces or for shorter distances, the beam of light need not be focused as narrowly nor contain as much energy as for effectively smaller objects or surfaces or for longer distances. For the reception of light, the size and optical characteristics of the receive lens 106, the distance between the receive lens 106 and the photo-diode receiver 118, and the type of photodiode receiver 118 are selected to maximize the signal to noise ratio of the electronic pulse that is generated in response to receiving a reflected beam of light. The optical characteristics of the light transmission components of the distance-measurement apparatus 100 and the effective size, reflectivity, and expected distances of the intended objects or surfaces are considered in determining appropriate characteristics for the light reception components. The considerations for both transmission and reception of light are described in greater detail below with reference to FIGS. 9 and 11.

If a hit occurs, so that sufficient light is reflected back to the distance-measurement apparatus 100 for detection, a portion of the reflected light contacts the outer surface of the receive lens 106. The receive lens 106 focuses incident light onto the photo-diode receiver 118. Referring again to FIG. 5, the photo-diode unit 226 generates an active high electronic pulse on the receive pulse line 264 upon receiving the reflected beam of light. The D flip-flop 220 receives the active high pulse at its clock input. This causes the D flip-flop 220 to become set to a logic one, as the D input is tied to the analog power line 294. The setting of the D flip-flop 220 generates a logic one on the receive detection line 266. The monostable multivibrator 214 receives the logic one at its trigger input and generates an active low pulse on the read A/D line 270. The S/A A/D 210 receives the active low pulse on the read A/D line 270 and performs an analog to digital conversion of the instantaneous voltage at the ramp voltage line 254. The voltage at the ramp voltage line 254 is the voltage across the charging capacitor 208. The charging capacitor 208 begins charging at approximately the same time that the light pulse is generated by the laser 120 and stops charging at approximately the same time that the light pulse is received by the photo-diode receiver 118. Thus, the voltage across the charging capacitor 208 is substantially proportional to the travel time of the light pulse in travelling from the distance-measurement apparatus 100 to the intended object or surface, and back. The voltage across the charging capacitor 208 is also substantially proportional to the distance between the distance-measurement apparatus 100 and the remote object or surface.

Referring to FIG. 6, the A/D control unit 290 receives the active low pulse on the read A/D line 270 and controls the S/A A/D 210 to convert the instantaneous voltage at the ramp voltage line 254 into a digital representation. The A/D control unit 290 generates a signal on the sample line 295. In response, the sample and hold latch 291 latches the instantaneous voltage at the ramp voltage line 254 and holds the analog voltage. The analog voltage is applied to a compare input of the comparator 280 over the sampled analog voltage line 293.

The A/D control unit 290 also loads the successive approximation register (SAR) 284 to a variety of different values to determine an appropriate digital representation of the analog voltage at the sampled analog voltage line 293. First, the A/D control unit 290 determines the appropriate logic level for the most significant bit (MSB) of the digital representation by loading the SAR 284 with a value having a logic one in the MSB and all zeros in the remaining bits. Thus, for a 12 bit S/A A/D 210, the initial value for the SAR 284 is 800 in hexadecimal notation (800 h). This value is applied to the D/A 282 over the digital data lines 272A to 272N. The D/A 282 converts the digital value from the SAR 284 into a corresponding analog voltage and applies the resulting voltage to the second compare input of the comparator 280 over the reference voltage line 286. The comparator 280 generates a signal on the compare line 288 that reflects the relative voltages on the sampled analog voltage line 293 and the reference voltage line 286. The A/D control unit 290 monitors the compare line 288 to determine the relative voltages. If the voltage on the sampled analog voltage line 293 is greater than or equal to the voltage on the reference voltage line 286, the A/D control unit 290 leaves the MSB of the SAR 284 set. Otherwise, the A/D control unit 290 clears the MSB of the SAR 284. At this point the appropriate logic level for the MSB for representing the sampled analog voltage has been established.

Next, the A/D control unit 290 determines an appropriate logic level for the next most significant bit of the digital representation. The SAR 284 is loaded with a value having a MSB as determined above, a next most significant bit that is a logic one and all zeros in the remaining bits. Thus, for a 12 bit S/A A/D 210, the next value for the SAR 284 is C00 h if the MSB has been determined to be a logic one, or 400 h if the MSB has been determined to be a logic zero. Again, this value is applied to the D/A 282 over the digital data lines 272A to 272N. The D/A 282 converts the digital value from the SAR 284 into a corresponding analog voltage and applies the resulting voltage to the second compare input of the comparator 280 over the reference voltage line 286. The comparator 280 generates a signal on the compare line 288 that reflects the relative voltages on the sampled analog voltage line 293 and the reference voltage line 286. The A/D control unit 290 monitors the compare line 288 to determine the relative voltages. If the voltage on the sampled analog voltage line 293 is greater than or equal to the voltage on the reference voltage line 286, the A/D control unit 290 leaves the next most significant bit of the SAR 284 set. Otherwise, the A/D control unit 290 clears the next most significant bit of the SAR 284. At this point the appropriate logic level for the MSB and the next most significant bit have been established.

The remaining bits of the digital representation are determined in the same manner. For each successive bit from the MSB to the least significant bit (LSB), the bit is set in the SAR 284, the resulting analog voltage on the reference voltage line 286 is compared with the sampled analog voltage, and the A/D control unit 290 leaves the bit set or clears the bit, depending on the result of the comparison. After each of the bits of the digital representation have been established using the above-described procedure, the final value is applied to the digital data lines 272A to 272N, and the A/D control unit 290 asserts a signal on the data available line 273.

The microprocessor 212 receives the digital representation of the sampled analog voltage on the digital data lines 272A to 272N when the signal on the data available line 273 is activated. The microprocessor 212 computes the distance between the distance-measurement apparatus 100 and the remote target using the digital value received from the S/A A/D 210, and the present distance-measurement cycle is complete. As described above, a number of distance-measurements are averaged to more accurately determine the desired distance.

The second embodiment of the electronic unit 122 of FIG. 7 operates in the same manner as the first embodiment of the electronic unit 122 of FIG. 5, except as indicated immediately below. The microprocessor 212 begins a distance-measurement cycle by generating a positive transmit pulse on the discharge/trigger line 358. When the pulse on the discharge/trigger line 358 is high, the discharge switch 306 is closed, causing the charging capacitor 308 to discharge. When the signal on the discharge/trigger line 358 goes low again, the discharge switch 306 is opened, so that the charging capacitor 308 no longer discharges. Also, the monostable multivibrator 318 is triggered at the active low trigger input. The pulse on the discharge/trigger line 358 must be high long enough to allow the charging capacitor 308 to discharge any accumulated voltage.

The monostable multivibrator 318 generates a pulse on the transmit pulse line 362 in response to the high-to-low transition of the discharge/trigger line 358. The D flip-flop 320 receives the pulse from the monostable multivibrator 318 at the reset input, and the D flip-flop 320 is reset. The light transmitter unit 224 also receives the pulse generated by the monostable multivibrator 318 and generates a pulse of light. The resetting of the D flip-flop 320 generates a logic one at the charge line 368. The logic one at the charge line 368 closes the charge switch 304, which causes the charging capacitor 308 to begin charging.

If a hit occurs, the photo-diode unit 226 generates an active high electronic pulse on the receive pulse line 364 upon receiving the reflected beam of light. The D flip-flop 320 receives the active high pulse at its clock input. This causes the D flip-flop 320 to become set to a logic one, as the D input is tied to the analog power line 294. The setting of the D flip-flop 320 generates a logic one on the receive detection line 366, which notifies the microprocessor 212 that a hit has occurred. The setting of the D flip-flop 320 also generates a logic zero on the charge line 368, which opens the charge switch 304 to cause the charging capacitor 308 to stop charging. Thus, the charging capacitor 308 begins to charge at approximately the same time that a pulse of light is transmitted and the charging capacitor 308 stops charging at approximately the same time that a reflected light pulse is detected. At this point, the charge across the charging capacitor 308 is substantially proportional to the distance between the distance-measurement apparatus 100 and the remote surface off which the light pulse reflected.

Now, the slow-charge resistor 309, the slow-charge capacitor 310, the voltage comparator 312, and the microprocessor 212 perform an analog-to-digital conversion of the voltage across the charging capacitor 308. After receiving the logic one on the receive detection line 366, the microprocessor 212 generates an activate low reset pulse at the reset output. The active low pulse discharges any accumulated charge on the slow-charge capacitor 310. Next, the microprocessor 212 tri-states the reset output, which allows the slow-charge capacitor 310 to begin to charge by current flowing through the slow-charge resistor 309. The microprocessor 212 also begins an internal counter at the same time that the slow-charging capacitor 310 begins to charge. The value of the resistor 309 and the capacitor 310 are selected so that the capacitor 310 charges slowly enough to allow an analog-to-digital conversion using the relatively slow clock of the microprocessor 212. As the capacitor 310 charges, the voltage at the ramp voltage line 372 gradually increases. Initially, the voltage comparator 312 generates a signal on the compare-equal line 370 indicating that the respective input voltages are not equal to one another. When the voltage at the ramp voltage line 372 reaches the voltage level stored in the capacitor 308, the voltage comparator 312 generates a signal on the compare-equal line 370 indicating that the two input voltages are equal. At this point, the microprocessor 212 stops the internal counter. Based on the charging rate of the slow-charge capacitor 310, the clock frequency of the microprocessor 212 and the digital count of the internal counter of the microprocessor 212, the microprocessor 212 determines the voltage across the charging capacitor 308. Based on the voltage across the charging capacitor 308, the microprocessor 212 determines the distance between the distance-measurement apparatus 100 and the remote surface, which is substantially proportional to the voltage across the charging capacitor 308. Although in the preferred embodiment the microprocessor 212 determines a digital value that represents the voltage across the charging capacitor 308, the values of the slow-charge resistor 309 and the slow-charge capacitor 310 may be selected, in conjunction with the clock speed of the microprocessor 212, so that the digital value produced by the internal clock of the microprocessor 212 directly represents the distance between the distance-measurement apparatus 100 and the remote surface. The current used to charge the slow-charge capacitor 310 need not be constant, because the adjustment for the nonlinear charging of the capacitor 310 is relatively simple and accurate because of the longer charging time, in comparison to the charging capacitor 308.

Figure 8A:
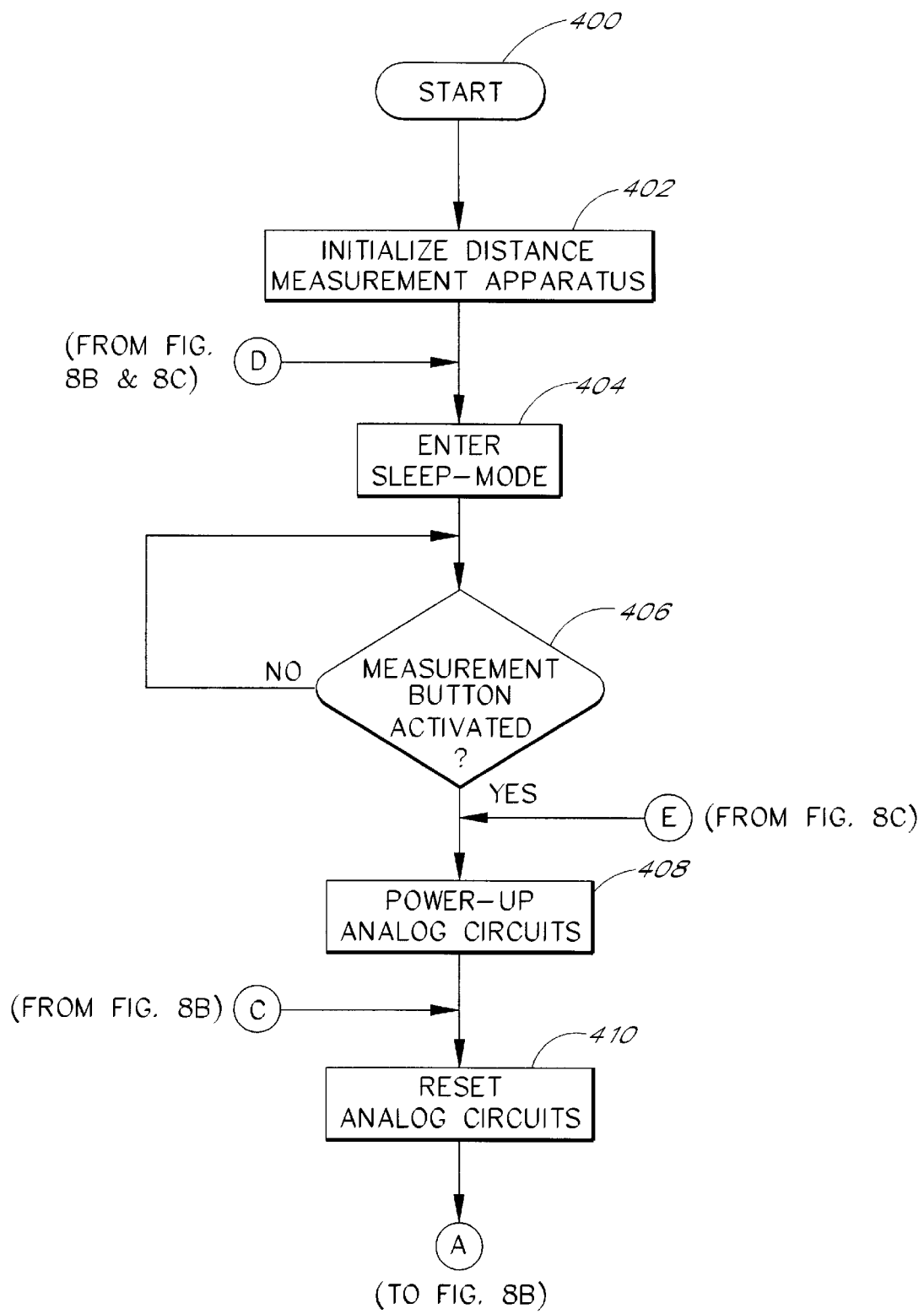
FIGS. 8A, 8B, and 8C form a flow chart that illustrates a method performed by the microprocessor of FIGS. 5 and 7 to cause the distance-measurement apparatus to perform distance measurements.
Figure 8B:
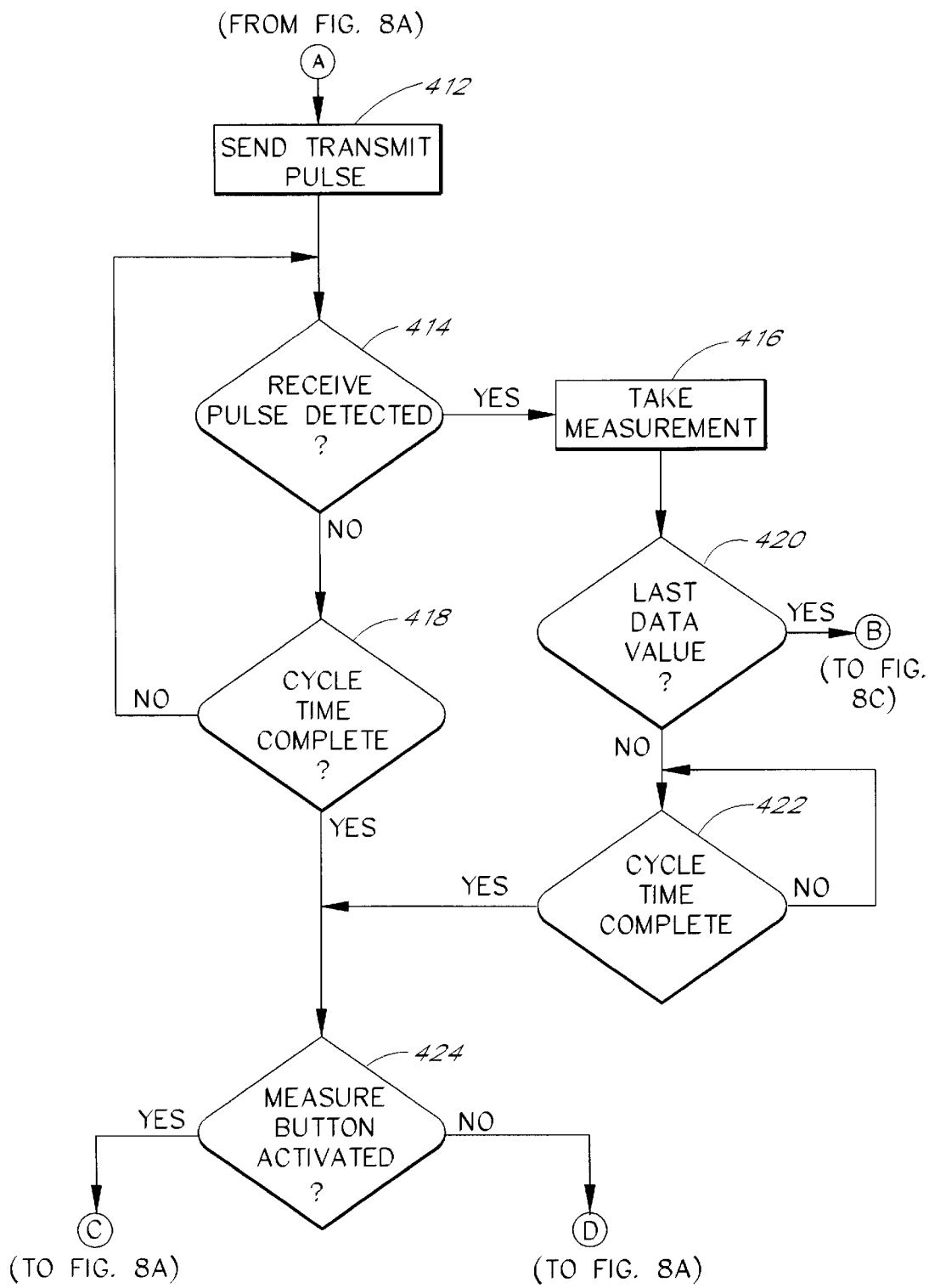
Figure 8C:
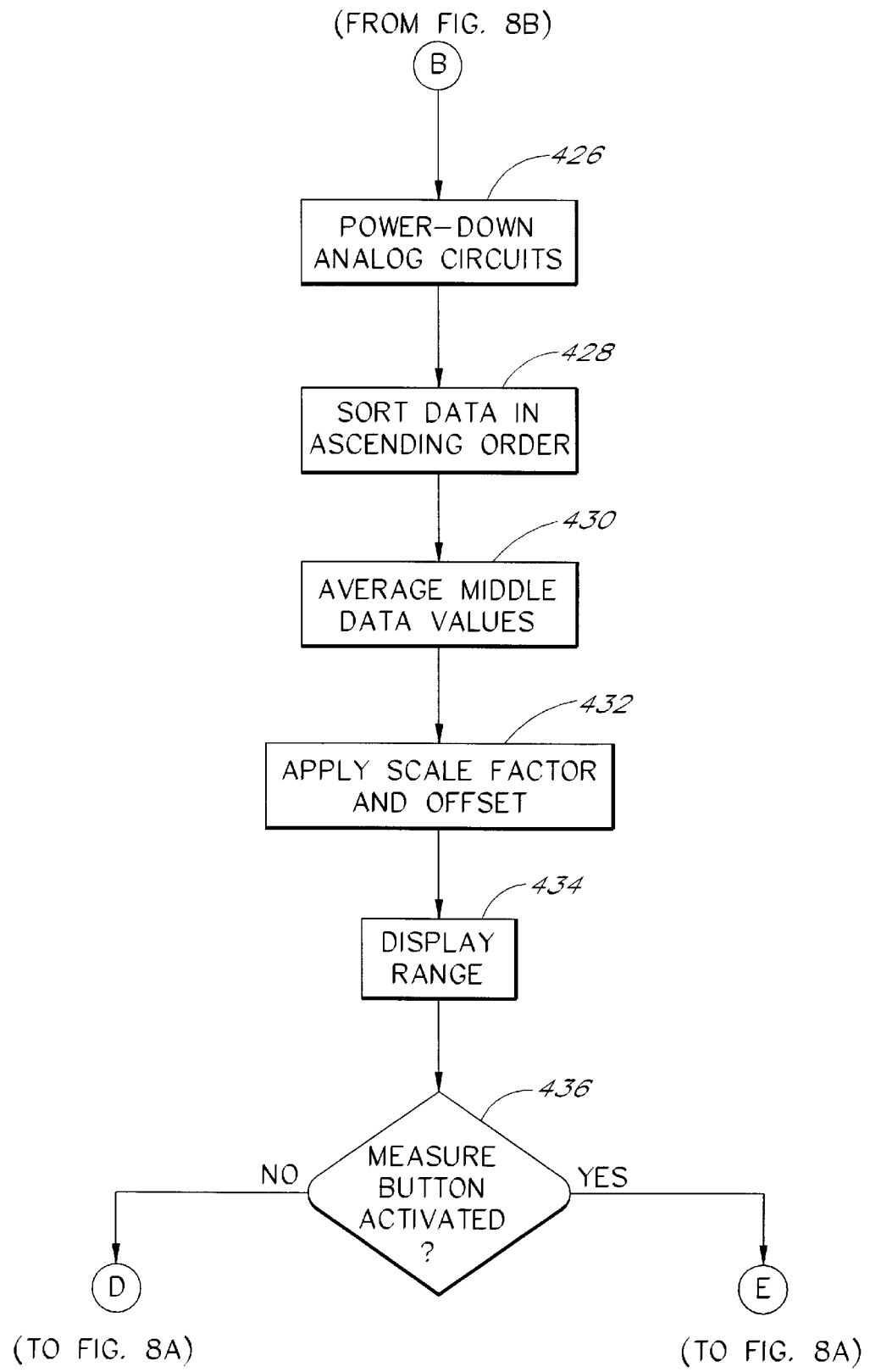

FIGS. 8A, 8B, and 8C form a flowchart that illustrates a method performed by the microprocessor 212 in the embodiment of FIG. 5 and a similar method performed by the microprocessor 212 in the embodiment of FIG. 7 to perform distance-measurement operations. During the method of FIGS. 8A, 8B and 8C, the microprocessor 212 controls the distance-measurement apparatus 100 to perform distance measurements and to display the results on the range display 114. The method begins at an initial block 400.

At a process block 402, the microprocessor 212 initializes the distance-measurement apparatus 100. The process block 402 is executed when power is initially applied to the distance-measurement apparatus 100. In the preferred embodiment, for example, the process block 402 is executed when a rechargeable battery is inserted into the distance-measurement apparatus 100. During the process block 402, the microprocessor 212 controls the power supply 222 using the analog power control line 278 to disable power to the analog power line 294. Thus, the microprocessor 212 removes power from the time measurement circuit 162 or 302, the light transmitter unit 224 and the photodiode unit 226. Next, the microprocessor 212 tests the range display 114 by driving it to display a sequence of digits from zero to nine for each digit location of the range display 114. The microprocessor 212 also checks the voltage level provided by the power supply 222 on the microprocessor power line 298. If the voltage at the microprocessor power line 298 is below a predetermined threshold, the microprocessor 212 illuminates the low-battery indicator 142 (FIGS. 2 and 3).

At a process block 404, the microprocessor 212 enters a sleep mode in which the power consumed by the microprocessor 212 is substantially reduced.

At a decision block 406, the microprocessor 212 determines whether the measure button 110 has been activated. The measure button 110 is connected to an interrupt input of the microprocessor 212 that causes the microprocessor 212 to exit the sleep mode and return to operational mode upon activation of the measure button 110. If the measure button 110 has not been activated, the microprocessor 212 remains in the sleep mode and continues to execute the decision block 406 until the measure button 110 is activated. When the measure button 110 is activated, the microprocessor 212 advances to a process block 408.

At the process block 408, after being interrupted by the activation of the measure button 110, the microprocessor 212 begins a distance-measurement operation. The microprocessor 212 controls the power supply 222 using the analog power control line 278 to enable power to the analog power line 294. Thus, the microprocessor 212 causes the power supply 222 to supply power to the time measurement circuit 162 or 302, the light transmitter unit 224 and the photodiode unit 226.

At a process block 410, the microprocessor 212 begins a distance-measurement cycle. First, referring to FIG. 5, the distance-measurement cycle is described in terms of the first embodiment of the electronic unit 122. The microprocessor 212 generates a reset pulse on the reset analog line 268 to reset the D flip-flops 220 and 216. The resetting of the D flip-flop 220 enables the time measurement circuit 162 to receive a return pulse of light. The resetting of the D flip-flop 216 closes the charge/discharge switch 206 to discharge the charging capacitor 208.

At a process block 412, the microprocessor 212 generates a transmit pulse on the trigger line 258, which is received by the monostable multivibrator 218. The monostable multivibrator 218 causes the light transmitter unit 224 to generate a pulse of light, and it opens the charge/discharge switch 206. Opening the charge/discharge switch 206 allows the constant current source 200, as controlled by the charge rate selector resistor 202 and the constant current transistor 204, to charge the charging capacitor 208 in a substantially linear manner.

At a decision block 414, the microprocessor 212 determines whether a receive pulse has been detected. If the light beam from the transmit lens 104 reflects off an object or surface and reflects back to the receive lens 106, the receive lens 106 focuses the return beam of light toward the photodiode receiver 118. The photodiode unit 226 generates an electronic signal at the receive pulse line 264 that is responsive to the amount of electromagnetic radiation contacting an active surface of the photodiode receiver 118 that is within the range of detection of the photodiode receiver 118. If the photodiode unit 226 generates an electronic pulse of sufficient magnitude, in response to a sufficient quantity of reflected light, the D flip-flop 220 is set. In response to the setting of the D flip-flop 220, the monostable multivibrator 214 causes the S/A A/ID 210 to convert the instantaneous voltage across the charging capacitor 208 into a digital value. The S/A A/D 210 generates a corresponding digital value on the digital data lines 272A to 272N, and asserts the data available line 273. Thus, if the microprocessor 212 receives an active signal on the data-available line 273, the microprocessor 212 determines that a receive pulse was detected by the photodiode unit 226.

Next, referring to FIG. 7, the distance-measurement cycle is described in terms of the second embodiment of the electronic unit 122. At the process block 410, the microprocessor 212 generates a transmit pulse on the discharge/trigger line 358 to discharge the charging capacitor 308.

At a process block 412, the microprocessor 212 generates a falling edge on the discharge/trigger line 358 to trigger the monostable multivibrator 318. The monostable multivibrator 318 causes the light transmitter unit 224 to generate a pulse of light, and it resets the D flip-flop 320. After the falling edge on the discharge/trigger line 358, the discharge switch 308 is open, so that the charging capacitor 308 no longer discharges. Also, the resetting of the D flip-flop 320 closes the charge switch 304, which causes the charging capacitor 308 to begin charging.

At a decision block 414, the microprocessor 212 determines whether a receive pulse has been detected. Again, if the photodiode unit 226 generates an electronic pulse of sufficient magnitude, in response to a sufficient quantity of reflected light, the D flip-flop 320 is set. In response to the setting of the D flip-flop 320, the charge switch 304 is opened to stop the charging of the charging capacitor 308. Also, the microprocessor 212 detects the setting of the D flip-flop 320 by monitoring the receive detection line 366. The microprocessor 212 controls the discharging and charging of the slow-charge capacitor 310, and uses an internal counter to effectively determine the analog voltage across the charging capacitor 308. The microprocessor 212 determines that a receive pulse was detected by the photodiode unit 226 by receiving an active signal on the receive detection line 366.

Referring again to both of the illustrated embodiments of the electronic unit 122, as illustrated in FIGS. 5 and 7, if no receive pulse is detected at the decision block 414, the microprocessor 212 advances to a decision block 418. At the decision block 418, the microprocessor 212 checks an internal timer to determine whether the cycle time for the present transmit pulse is complete. In the preferred embodiment, the cycle time is approximately 2.5 ms. An appropriate cycle time can be determined based on government regulation of devices that emit electromagnetic radiation. If the cycle time is not complete, the microprocessor 212 returns to the decision block 414. If the cycle time is complete, the microprocessor 212 advances to a decision block 424. At this point the transmit pulse was sent, but a return pulse was not received. Thus, the distance-measurement cycle is complete, but no current data value has been obtained.

At the decision block 424, the microprocessor 212 determines whether the measure button 110 remains activated. If the measure button remains activated, the microprocessor 212 returns to the process block 410 (FIG. 8A). If the measure button 110 is no longer activated, the microprocessor 212 discards any previously obtained data, checks the voltage level provided by the power supply 222, momentarily illuminates the low-battery indicator 142, if necessary, and returns to the process block 404 (FIG. 8A).

If a receive pulse is detected at the decision block 414, the microprocessor 212 advances to a process block 416. At the process block 416, the microprocessor 212 reads the digital representation of the sampled voltage either on the digital data lines 272A to 272N or from the internal counter. The microprocessor 212 may need to adjust the value obtained from the internal counter to compensate for nonlinear charging of the slow-charge capacitor 310. This completes the present distance-measurement cycle with the microprocessor 212 having obtained a current data value.

At a decision block 420, the microprocessor 212 determines whether the last data value for the current distance-measurement operation has been obtained. As indicated above, in the preferred embodiment, the last data value is the sixty fourth data value.

If the last data value has not been obtained, the microprocessor 212 advances to a decision block 422. At the decision block 422, the microprocessor 212 checks an internal timer to determine whether the cycle time has been completed. If the cycle time has not been completed, the microprocessor 212 continues to execute the decision block 422 until the cycle time is complete. When the cycle time is complete, the microprocessor 212 advances to the decision block 424.

If the last data value has been obtained at the decision block 420, the microprocessor 212 advances to a process block 426 (FIG. 8C). At this point, the microprocessor 212 has obtained all of the required data values and can proceed to accurately determine the distance between the distance-measurement apparatus 100 and the remote object or surface. At the process block 426, the microprocessor 212 controls the power supply 222 using the analog power control line 278 to disable power on the analog power line 294 to power down the time measurement circuit 162 or 302, the light transmitter unit 224 and the photodiode unit 226.

At a process block 428, the microprocessor 212 rearranges all the data values that have been obtained so that the data values are in ascending order from the lowest value to the highest value.

At a process block 430, the microprocessor 212 determines the average of a block of data values that is within the extremes of the ascending order. Thus, the microprocessor 212 discards a block of data values at the lower end of the ascending order and another block at the higher end of the ascending order. As indicated above, for the preferred embodiment, the lowest 16 data values and the highest 16 data values are discarded. The remaining 32 data values are averaged.

At a process block 432, the microprocessor 212 applies a scale factor to convert the average voltage into a corresponding distance measurement. An appropriate scale factor is determined from the speed of light and the charging rate of the charging capacitor 208 or 308. The microprocessor 212 also adjusts the resulting distance measurement by an offset to account for delays and other variations in the distance-measurement apparatus 100. The sequence of calculations for determining an accurate value for the desired distance measurement can be altered without changing the overall result. For example, the time measurements can be converted to corresponding distance measurements before the values are sorted and averaged.

At a process block 434, the microprocessor 212 generates appropriate electronic signals on the range display bus 276 to cause the range display 114 to display the resulting distance measurement. The microprocessor 212 maintains the display of the distance-measurement result for approximately 5 seconds.

After the process block 434, the microprocessor 212 advances to a decision block 436. At the decision block 436, the microprocessor 212 determines whether the measure button 110 is still active. If the measure button 110 is still active, the microprocessor 212 returns to the process block 408 (FIG. 8A). Otherwise, the microprocessor 212 returns to the process block 404 (FIG. 8A).

In summary, in the method of FIGS. 8A, 8B, and 8C, the microprocessor 212 enters a sleep mode when the distance-measurement apparatus 100 is not performing a distance-measurement operation. A distance-measurement operation generally comprises the steps of discharging the charging capacitor 208 or 308, generating a pulse of light at the laser diode 120, beginning to charge the charging capacitor 208 or 308, detecting whether a reflected light pulse has been received at the photodiode receiver 118, and converting the accumulated voltage across the charging capacitor 208 or 308 to a digital value upon reception of a reflected light pulse. When a predetermined number of digital values have been obtained, the microprocessor 212 powers down most of the components of the electronic unit 122, sorts the digital values into ascending order, discards a predetermined number of digital values having the lowest numerical values, discards a predetermined number of digital values having the highest numerical values, averages the digital values that have not been discarded, applies a scale factor and an offset to the average of the digital values to obtain a distance-measurement value, and displays the distance-measurement value on the range display 114. A person of skill in the art will understand that the sequence of the data manipulations and calculations required to determine a distance-measurement value from the obtained set of digital values can be altered without effectively changing the method of obtaining a distance-measurement value.

A reflective target may be used in conjunction with the distance-measurement apparatus 100 to form a distance-measurement system. The reflective target is preferably substantially more efficient at reflecting light back towards a light source than most other surfaces. Thus, the light beam from the distance-measurement apparatus 100 can be directed toward the target, so that the target reflects a relatively high proportion of the incident light back toward the distance-measurement apparatus 100. Use of a target that is substantially more reflective than other surfaces that are encountered in a specific application is generally advantageous in that the distance-measurement apparatus 100 can generally be designed to detect light pulses that are reflected off the target, but to ignore light pulses that reflect off other surfaces. Light pulses that have reflected off the target will generally have substantially greater magnitude than light pulses that have reflected off other surfaces. Thus, the sensitivity of the photodiode unit 226 can be designed to only detect the light pulses with greater magnitudes. In some applications, however, use of a target is either not possible, or not practical.

Figure 9:
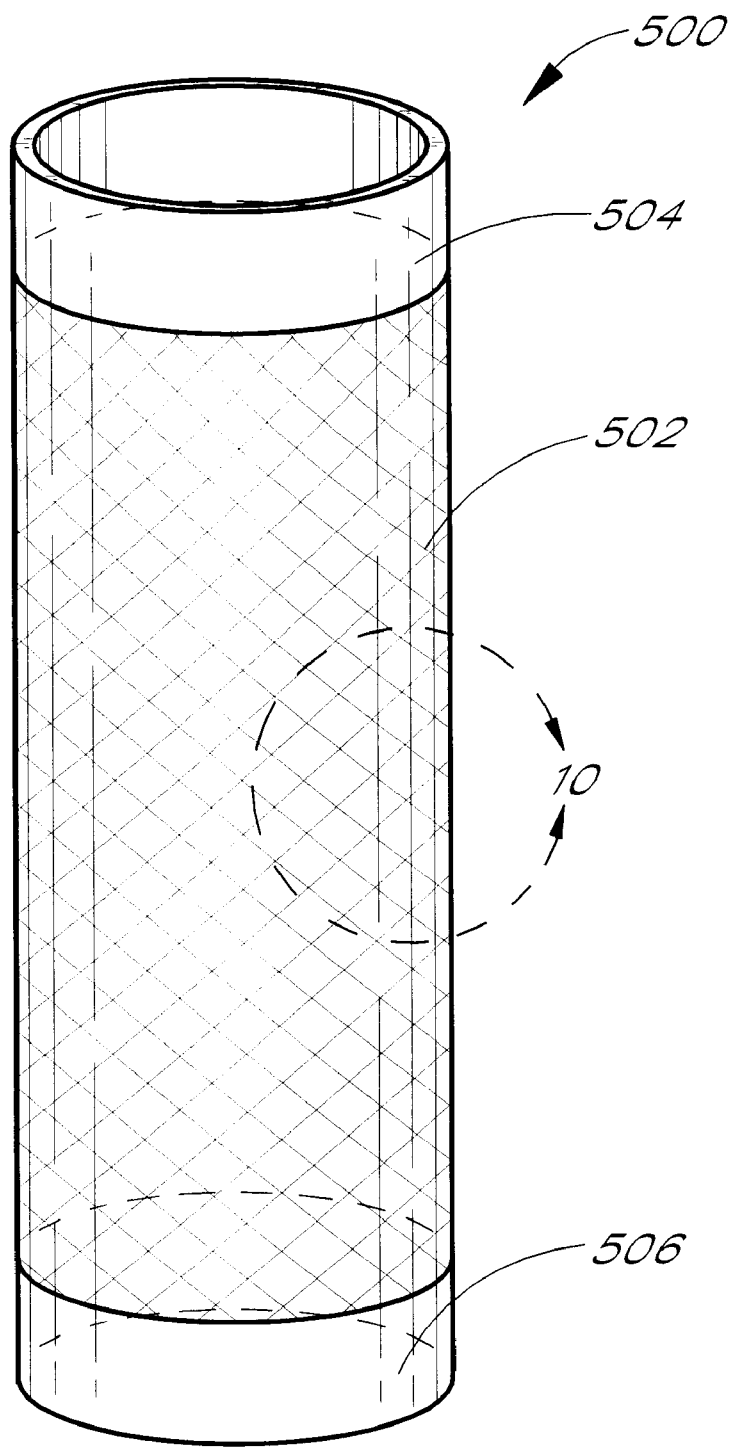
FIG. 9 is a perspective view of a first embodiment of a target that can be used in connection with the distance-measurement apparatus.

The size, shape, and other characteristics of the reflective target may vary substantially, depending on the application involved. FIG. 9 illustrates a preferable reflective target 500 for use in a golf environment. The reflective target 500 may also be used in numerous other environments. The reflective target 500 comprises a substantially cylindrical tube. Alternatively, the reflective target 500 may have an elongated octagonal shape, or other similar shape. The reflective target 500 has a diameter of approximately 1.5 inches. The reflective target 500 comprises a reflective surface 502 that circumferentially encompasses the reflective target 500. The reflective surface 502 has a length of approximately 12 inches. In the preferred embodiment, the reflective surface 502 comprises a material that, when mounted on a planar surface, is at least 1000 times more reflective than a Lambertian target.

Many reflective surfaces only provide sufficient reflectivity for relatively small entrance angles. Such reflective surfaces are not desirable in a golf application and many other applications. In a golf application, for example, the angle between the golfer using the distance-measurement apparatus 100 and the target 500 may be any horizontal angle, from 0 to 360 degrees. Thus, the target 500 should preferably provide sufficient reflectivity at any horizontal entrance angle. On the other hand, providing sufficient reflectivity at a wide range of vertical entrance angles in a golf application is not as important. The substantially cylindrical shape of the preferred embodiment of the reflective target 500 provides reflectivity at substantially all horizontal entrance angles. Thus, a light beam reflects off the reflective target 500 and back toward the distance-measurement apparatus 100, regardless of the direction from which a golfer is approaching the target 500. In the preferred embodiment, the reflective target 500 is at least 1000 times more reflective than a Lambertian target for any entrance angle in a 360 degree circumference about the reflective target 500. In an application for which vertical entrance angles are more important, a ring-shaped target or a spherical target may be preferred. The reflective target 500 may also comprise strips 504 and 506 that can be used for advertising. Each of the strips 504 and 506 is preferably 0.75 inches wide.

Figure 10:
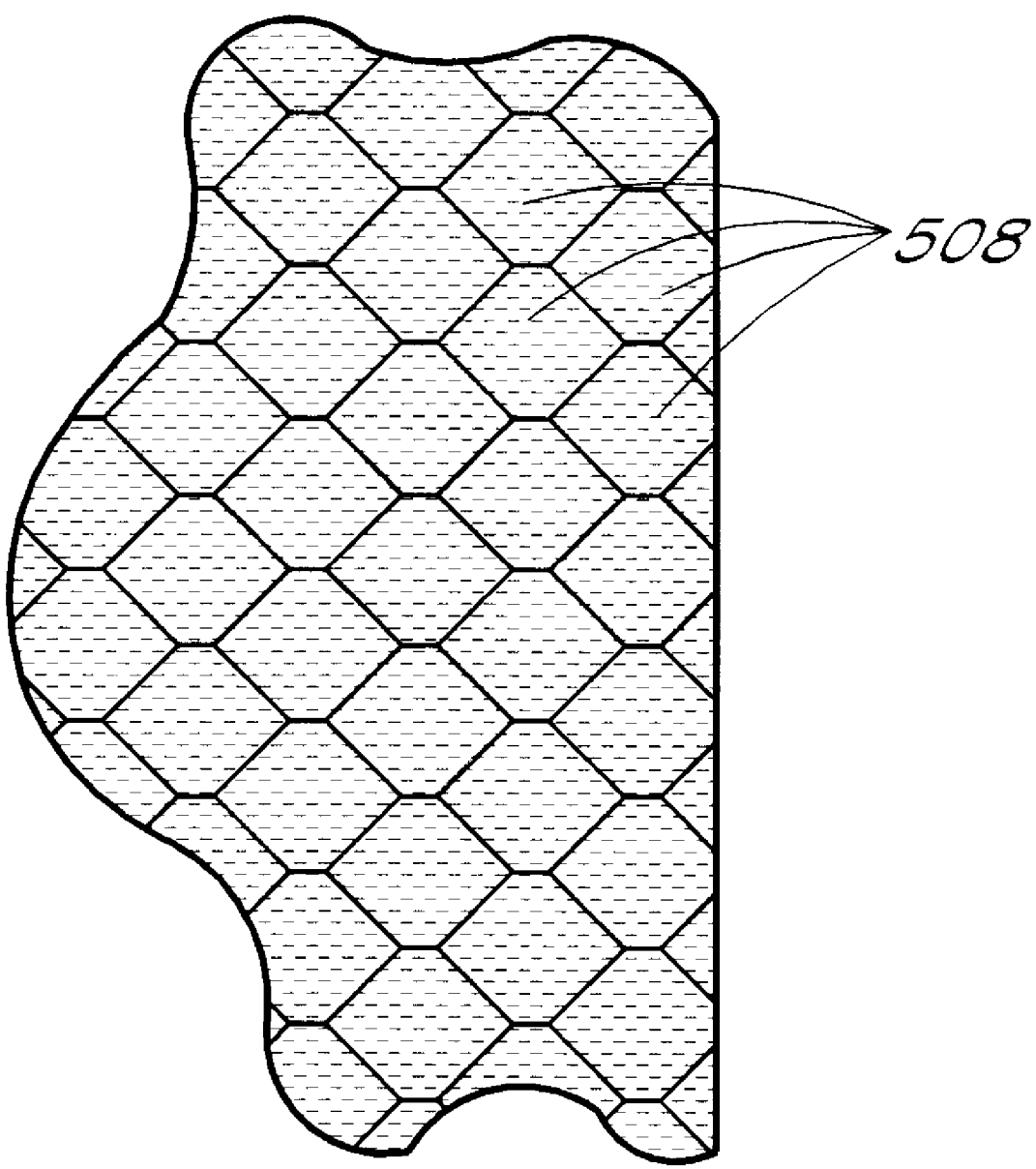
FIG. 10 illustrates a preferred reflective surface of the target of FIG. 9.

FIG. 10 illustrates the structure of the reflective surface 502 of the preferred embodiment. The reflective surface 502 is preferably a reflective tape material that can be applied to various surfaces. The reflective surface 502 preferably comprises a large number of closely spaced micro retro-reflectors 508. Each micro retro-reflector 508 is preferably a three dimensional structure having a cross-sectional area on the order of tens or hundreds of microns. Each micro retro-reflector 508 simulates the reflective characteristics of a cube corner. Namely, each micro retro-reflector 508 preferably reflects substantially all incident light back in precisely the same direction from which the light came. The micro retro-reflectors 508 of the reflective surface 502 may be covered by a transparent coating. The reflective surface 502 may, for example, comprise a strip of reflective tape sold by the 3M Packaging Systems Division, and described as "2000X RetroReflective Targets". Other reflective materials may also be used for the reflective surface 502.

Figure 11:
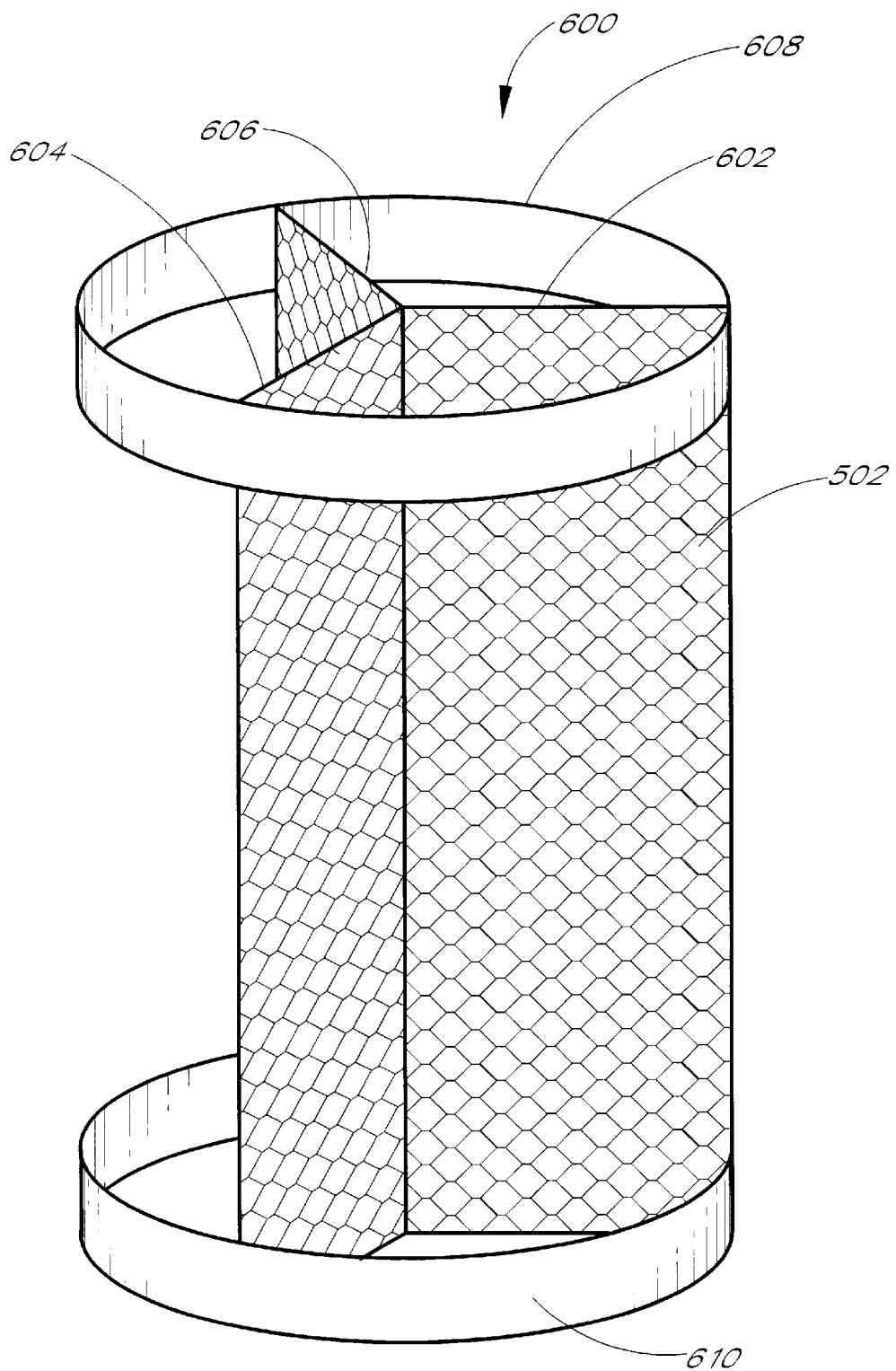
FIG. 11 is a perspective view of a second embodiment of a target that can be used in connection with the distance-measurement apparatus.

FIG. 11 illustrates a second embodiment of a reflective target 600 that can be used with the distance-measurement apparatus 100. The reflective target 600 comprises a set of three panels 602, 604, and 606. All of the panels 602, 604, and 606 are connected together along a central axis. Each of the panels 602, 604, and 606 extend outwardly from the central axis to form three horizontal angles of approximately 120 degrees each. The reflective target 600 also preferably comprises a top ring 608 and a bottom ring 610. The top ring 608 is preferably connected to an outside edge of each of the panels 602, 604, and 606 at the top of the reflective target 600. The bottom ring 610 is preferably connected to an outside edge of each of the panels 602, 604, and 606 at the bottom of the reflective target 600. Thus, the outside dimensions of the reflective target 600 defined by the rings 608 and 610 and the panels 602, 604, and 606 is a generally cylindrical shape. The diameter of the generally cylindrical shape of the reflective target 600 is preferably approximately 2 inches, while the length is preferably approximately 4.5 inches. The rings 608 and 610 serve to protect the panels 602, 604, and 606 from damage. Each of the panels 602, 604, and 606 is preferably covered, on both sides, with the same reflective surface 502 that is illustrated and described above with reference to FIGS. 9 and 10.

Either of the targets 500 or 600, or targets having other shapes and sizes, may, for example, be attached to the top of a pole in a variety of applications. In a golf application, either of the targets 500 or 600 may be attached to the top of the pin at each hole of the course. Either of the targets 500 or 600 may also be used for other purposes on a golf course. For example, a target 500 or a target 600 may be placed at or near a "hazard", such as a sand trap, so that the golfer can determine the distance to the hazard. Also, a target 500 or a target 600 may be placed at or near the tee area. In this situation, after a golfer hits an initial drive from the tee area, the golfer can go to the location of the ball and measure the distance from the golf ball back to the tee, to determine how far he hit the ball. A substantially cylindrical reflective target having a diameter that is larger than 1.5 inches may be preferable for marking hazards and tee areas.

The reflective target 500 is preferable in a golf application, at least for placement on top of each pin on the course, because the reflective target 500 has a uniform reflectivity for all horizontal entrance angles. The reflectivity of the reflective target 600, on the other hand, is not uniform for all horizontal entrance angles. However, the reflective target 600 may be preferable in other applications because the reflective target 600 is more effective at reflecting light for some entrance angles than the reflective target 500.

A distance-measurement system for a golf environment preferably comprises a distance-measurement apparatus 100 and a plurality of targets 500. A reflective target 500 is preferably mounted on each of the pins on the golf course, near the top of the pin. Then, a golfer can determine the distance from any location on the golf course to any pin on the course, by standing at the desired location on the course and directing the light beam of the distance-measurement apparatus 100 toward the desired pin. The light beam from the distance-measurement apparatus 100 reflects off the target 500, back toward the distance-measurement apparatus 100. The distance-measurement apparatus 100 will then compute and display the distance between the distance-measurement apparatus 100 and the target 500.

As described above, the distance-measurement apparatus 100 is preferably designed to have an optimal optical relation with the type or types of objects or surfaces to which distances are to be measured in a specific application. Thus, in a golf environment, the optical characteristics of the distance-measurement apparatus 100 are selected to be compatible with the golf pin reflective target 500. In the preferred embodiment, for a golf environment, the laser diode 120 comprises an EG&G part number PGAU1S12 laser diode. The laser diode 120 is preferably driven with a peak power of 10 watts, a pulse width of 30 nanoseconds, and a cycle time of 400 pulses per second. The transmit lens 104 has a diameter of 25 millimeters and a back focal length of 26.5 millimeters. The transmit lens 104 is a positive or converging lens that effectively gathers light from the laser diode 120 for transmission toward the target 500, and it satisfies eye safety considerations. The receive lens 106 has a diameter of 40 millimeters and a back focal length of 42.5 millimeters. The receive lens 106 is preferably an aspheric lens that is highly corrected to obtain a small spot size at the photodiode receiver 118. The receive lens 106 is a positive or converging lens that efficiently gathers incident light and focuses it onto the photodiode receiver 118. The photodiode receiver 118 is preferably a SFH217 component, with or without filtering, as sold by Siemens.

An operator of the distance-measurement apparatus 100 can determine the distance between the distance-measurement apparatus 100 and a remote object or surface by pointing the distance-measurement apparatus 100 toward the remote object or surface and pressing and holding the measure button 110. If a correct hit occurs, the distance-measurement apparatus 100 displays the distance to the remote object or surface on the range display 114. To achieve a correct hit, the distance-measurement apparatus 100 must be positioned so that the remote object or surface is directly in front of the transmit lens 104, so that the transmit lens 104 directs the light from the laser diode 120 directly toward the remote object or surface.

In the preferred embodiment, the distance-measurement apparatus 100 comprises the viewfinder 108, as illustrated in FIGS. 1, 2, 3, and 4. The viewfinder 108 assists an operator in directing the light beam from the distance-measurement apparatus 100 toward a remote object or surface. Referring to FIG. 4, the length 146 of the reflector/window tube 126 is selected to be as long as practical. The distance 148 between the viewfinder light 124 and the reflector/window 134 is greater than the length 146. The reflector/window 134 is a spherical lens of uniform thickness, with a radius of curvature equal to twice the distance 148. The light from the viewfinder light 124 is directed toward a concave surface of the reflector/window 134. This concave surface of the reflector/window 134 has a coating that has a reflectivity of 0.25 to 0.50. Thus, generally, less than half the light from the viewfinder light 124 is reflected back into the viewfinder 108, while the remaining light passes through the reflector/window 134 and outside the viewfinder 108. In addition, the reflector/window 134 generally allows more than half of the light that is incident on the reflector/window 134 from outside the viewfinder 108, toward the operational end 102, to travel through the reflector/window 134 and into the viewfinder 108. The distance between the vertical center of the viewfinder light 124 and the vertical center of the reflector/window tube 126 is defined as a vertical travel distance 147 for reflected light. As illustrated in FIG. 4, the reflector/window 134 is not perpendicular to the reflector/window tube 126. Instead, the reflector/window 134 forms a bevel angle 143 with the reflector/window tube 126. The bevel angle 143 is selected so that the vertical travel distance 147 equals the distance 148 multiplied by the tangent of twice the bevel angle 143. The shape, position and orientation of the reflector/window 134 relative to the viewfinder light 124 substantially collimates the light from the viewfinder light 124 and directs the collimated light in a direction that is substantially parallel to the reflector/window tube 126. The reflector/window tube 126 is adjusted using the x-axis adjustment screw 130 and the y-axis adjustment screw 132 so that the reflector/window tube 126 is substantially parallel to the path of the light emitted from the transmit lens 104.

To use the viewfinder 108, an operator first activates the viewfinder switch 144 (FIG. 2), which activates the viewfinder light 124. Next, the operator looks through the viewfinder 108 from the user end 112. As described above, the reflector/window 134 allows light from the operational end 102 of the viewfinder 108 through to the inside of the viewfinder 108. Thus, the operator can see through the viewfinder 108 and observe anything that is directly in front of the viewfinder 108 toward the operational end 102. In addition, the viewfinder light 124 produces a beam of colored light that travels toward the reflector/window 134. Some of the light from the viewfinder light 124 is collimated and reflected back toward the eye of the operator. However, the reflector/window 134 does not reflect enough of the light for the operator to determine that the light has been reflected. Consequently, the light appears to be coming from in front of the viewfinder 108, toward the operational end 102. Thus, the operator sees a colored dot of light from the viewfinder light 124 superimposed on the view in front of the viewfinder 108. In addition, because the reflected light from the viewfinder light 124 is collimated, the colored dot appears to be very far away, allowing the operator's eye to focus on the object or surface to which the distance is to be measured. If the operator aligns the image of the colored dot with the image of the remote object or surface, the light beam of the distance-measurement apparatus 100 is directed toward the remote object or surface. Next, the operator presses and holds the measure button 110 to perform a distance-measurement operation, and the distance-measurement apparatus 100 displays the distance to the remote object or surface on the range display 114. Other viewfinding devices may also be used in connection with the distance-measurement apparatus 100, instead of the superimposed light beam viewfinder 108 of the preferred embodiment.

The Enhanced Viewfinding System

In an alternate embodiment, the distance-measuring device 100 incorporates an enhanced viewfinding system which improves the quality of a distance measurement by providing visual feedback to the user. The visual feedback is provided by using the microprocessor 212 to control the viewfinder light 124.

The viewfinder light 124 is provided primarily to help the user accurately aim the distance-measuring device 100. In previous designs, the viewfinder light 124 did not turn on until after the data measurement cycle had begun. This technique conserved power, but, unfortunately the user could not accurately aim the device until measurements had begun. In the enhanced viewfinding system, the viewfinder light 124 turns on before a measurement cycle begins and thus allows the user to accurately aim the distance-measuring device 100 before taking any data. This greatly improves the quality of the data obtained by ensuring that no measurements are taken until the device is properly aimed (i.e., measurements are prevented until the device is properly aimed). Once the device is aimed, the user initiates a distance measurement cycle. The viewfinder light 124 stays on during the distance measurement cycle so that the user can keep the distance-measuring device 100 properly aimed. This ensures that each data point gathered during the distance measurement cycle corresponds to a reflection from the desired target. This improves the accuracy and reliability of the distance measurement. The viewfinder light 124 then turns off when the distance measurement cycle is complete. The viewfinder light 124 can also be made to flash in a manner that indicates the quantity and quality of data obtained during the distance measurement cycle.

Figure 12:
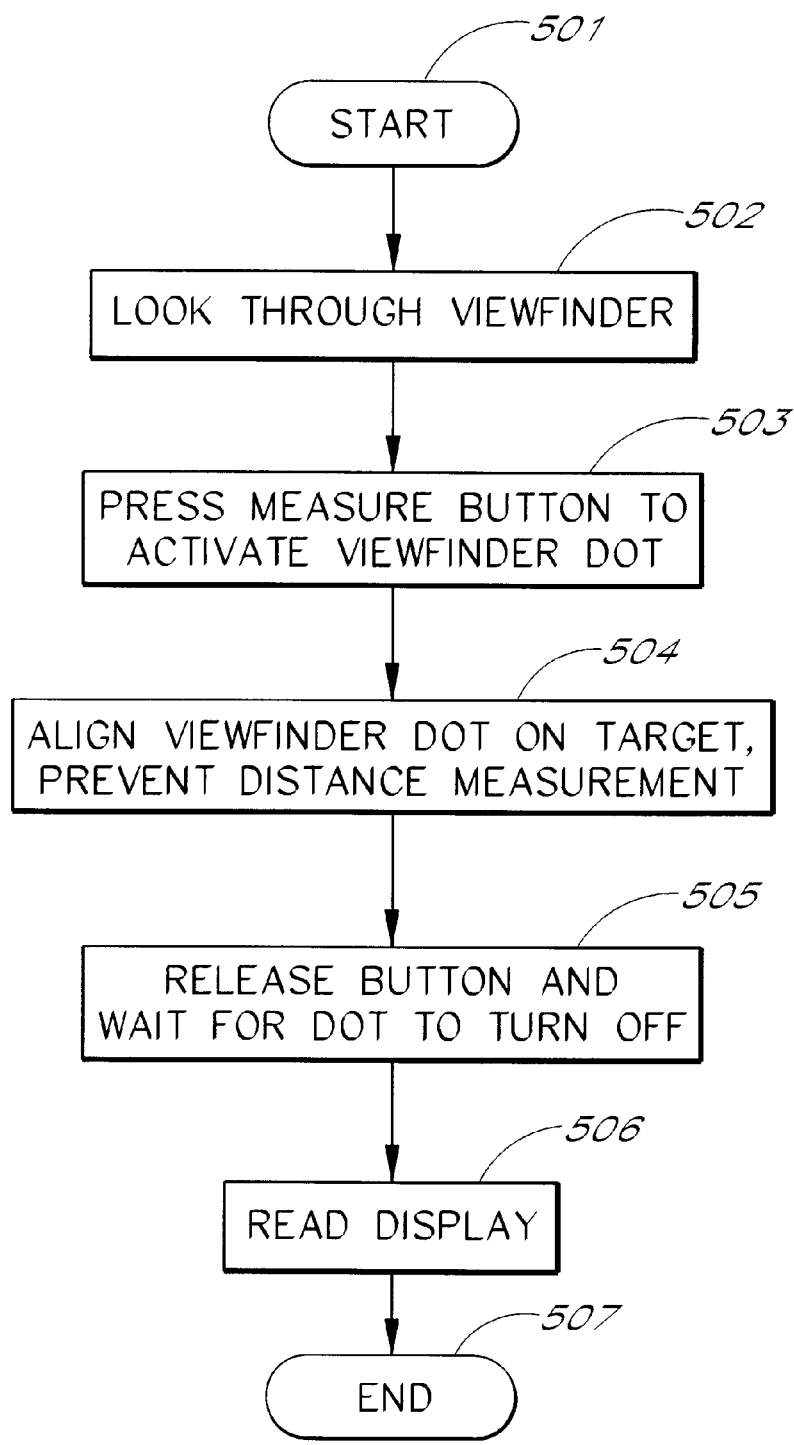
FIG. 12 is a flow chart that illustrates how a user interacts with an enhanced viewfinding system.

FIG. 12 shows a flowchart that illustrates the interaction between the user and the enhanced viewfinding system. The method begins at an initial block 501 and advances to a process block 502. At the process block 502, the user looks through the viewfinder to locate the object to be ranged. Advancing to a process block 503, the user presses the measure button 110 in order to activate the viewfinder 108. In response, the microprocessor 212 illuminates the viewfinder light 124. Advancing to a process block 504, the user moves the distance measuring apparatus 100 so that the viewfinder light 124 appears to be on top of the object. Advancing to a process block 505, the user releases the measure button 110 which signals the microprocessor 212 to perform all of the steps necessary to measure the distance to the target and update the display 114. Advancing to a process block 506, the microprocessor 212 deactivates the viewfinder light 124 to indicate that a distance measurement is complete, whereupon the user reads the display 114.

Figure 13:
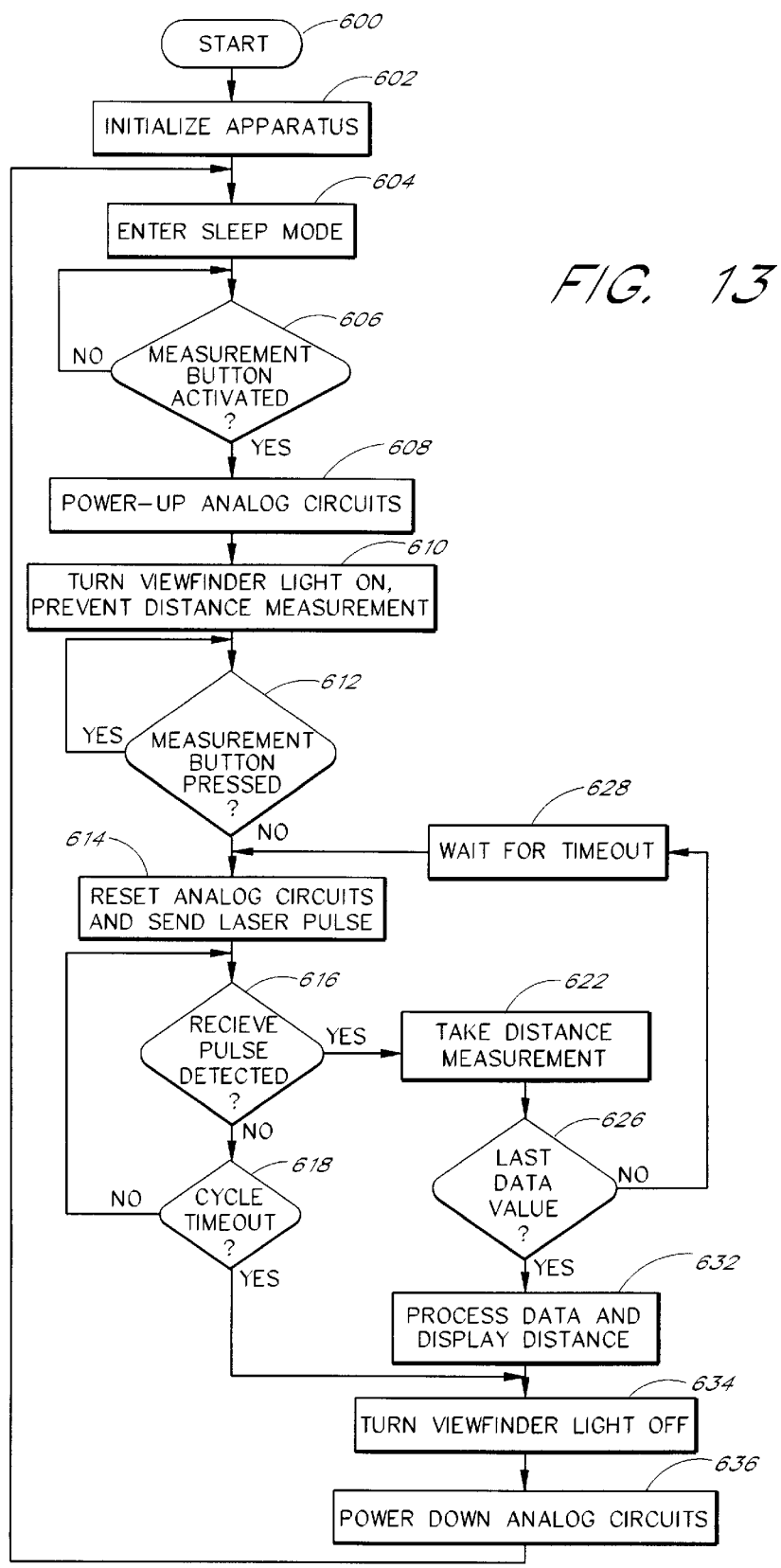
FIG. 13 is a flow chart that illustrates a method performed by the microprocessor of FIGS. 5 and 7 to implement an enhanced viewfinding system and perform distance measurements.

FIG. 13 shows a flowchart of the method used by the microprocessor 212 to implement the enhanced viewfinding system. The method begins at an initial block 600 and immediately advances to a process block 602.

In the process block 602, the microprocessor 212 initializes the distance-measurement apparatus 100. The microprocessor 212 executes process block 602 when power is initially applied to the distance measurement apparatus 100. In the preferred embodiment, for example, the process block 602 is executed when a rechargeable battery is inserted into the distance-measurement apparatus 100. During the process block 602, the microprocessor 212 controls the power supply 222 using the analog power control line 278 to disable power to the analog power line 294. Next, the microprocessor 212 tests the range display 114 by driving it to display a sequence of digits from zero to nine for each digit location of the range display 114. The microprocessor 212 also checks the voltage level provided by the power supply 222 on the microprocessor power line 298. If the voltage at the microprocessor power line 298 is below a predetermined threshold, the microprocessor 212 illuminates the low-battery indicator 142 (see FIGS. 2 and 3).

Advancing to a process block 604, the microprocessor 212 enters a sleep mode in which the power consumed by the microprocessor 212 is substantially reduced. Once in sleep mode, the microprocessor advances to a decision block 606.

In the decision block 606, the microprocessor 212 determines whether the measure button 110 has been activated. The measure button 110 is connected to an interrupt input of the microprocessor 212 that causes the microprocessor 212 to exit the sleep mode and return to operational mode upon activation of the measure button 110. The microprocessor 212 remains in the sleep mode and continues to execute the decision block 606 until the measure button 110 is activated. The measure button 110 is activated by the user during the process block 503 shown in FIG. 12.

When the measure button 110 is activated, the microprocessor 212 advances to a process block 608. In process block 608, the microprocessor 212 controls the power supply 222 using the analog power control line 278 to enable power to the analog power line 294. Thus, the microprocessor 212 causes the power supply 222 to supply power to the time measurement circuit 162 or 302, the light transmitter unit 224 and the photodiode unit 226. Advancing to a process block 610, the microprocessor 212 turns on the viewfinder light 124 and advances to a decision block 612. The microprocessor 212 continues to execute the decision block 612 until the measure button 110 has been released. The user releases the measure button 110 during process block 505 shown in FIG. 12. When the measure button 110 is released, the microprocessor 212 advances to a process block 614.

At the process block 614, the microprocessor 212 begins a distance-measurement cycle. First, referring to FIG. 5, the distance-measurement cycle is described in terms of the first embodiment of the electronic unit 122. The microprocessor 212 generates a reset pulse on the reset analog line 268 to reset the D flip-flops 220 and 216. The resetting of the D flip-flop 220 enables the time measurement circuit 162 to receive a return pulse of light. The resetting of the D flip-flop 216 closes the charge/discharge switch 206 to discharge the charging capacitor 208.

Continuing in the process block 614, the microprocessor 212 generates a transmit pulse on the trigger line 258, which is received by the monostable multivibrator 218. The monostable multivibrator 218 causes the light transmitter unit 224 to generate a pulse of light, and it opens the charge/discharge switch 206 by sending a clock pulse to the D flip-flop 216. Opening the charge/discharge switch 206 allows the constant current source 200, as controlled by the charge rate selector resistor 202 and the constant current transistor 204, to charge the charging capacitor 208 in a substantially linear manner. After generating the transmit pulse, the microprocessor advances to a decision block 616.

In the decision block 616, the microprocessor 212 determines whether a receive pulse has been detected. If the light beam from the transmit lens 104 reflects off an object or surface and reflects back to the receive lens 106, the receive lens 106 focuses the return beam of light toward the photodiode receiver 118. When the return beam of light contacts photodiode unit 226, it generates an electronic signal at the receive pulse line 264. If the photodiode unit 226 generates an electronic pulse of sufficient magnitude, in response to a sufficient quantity of reflected light, the D flip-flop 220 is set. In response to the setting of the D flip-flop 220, the monostable multivibrator 214 causes the S/A A/D 210 to convert the instantaneous voltage across the charging capacitor 208 into a digital value. The S/A A/D 210 generates a corresponding digital value on the digital data lines 272A to 272N, and asserts the data available line 273. Thus, if the microprocessor 212 receives an active signal on the data-available line 273, the microprocessor 212 determines that a receive pulse was detected by the photodiode unit 226.

Next, referring to FIG. 7, the distance-measurement cycle is described in terms of the second embodiment of the electronic unit 122. In the process block 614, the microprocessor 212 generates a transmit pulse on the discharge/trigger line 358 to discharge the charging capacitor 308. The trailing edge on the transmit pulse on the discharge/trigger line 358 triggers the monostable multivibrator 318. The monostable multivibrator 318 causes the light transmitter unit 224 to generate a pulse of light, and it resets the D flip-flop 320. The trailing edge on the discharge/trigger line 358 also opens the discharge switch 306 so that the charging capacitor 308 no longer discharges. The resetting of the D flip-flop 320 closes the charge switch 304, which causes the charging capacitor 308 to begin charging. After triggering the monostable multivibrator 318, the microprocessor advances to a decision block 616.

At the decision block 616, the microprocessor 212 determines whether a receive pulse has been detected. When a sufficient quantity of reflected light hits the photodiode unit 226, the photodiode unit 226 generates a pulse that sets the D flip-flop 320. Setting the D flip-flop 320 opens the charge switch 304 and thereby stops the charging of the charging capacitor 308. The microprocessor 212 detects the setting of the D flip-flop 320 by monitoring the receive detection line 366. The microprocessor 212 controls the discharging and charging of the slow-charge capacitor 310, and uses an internal counter to effectively determine the analog voltage across the charging capacitor 308. The microprocessor 212 determines that a receive pulse was detected by the photodiode unit 226 by receiving an active signal on the receive detection line 366.

Referring again to both of the illustrated embodiments of the electronic unit 122, as illustrated in FIGS. 5 and 7, if no receive pulse is detected at the decision block 616, the microprocessor 212 advances to a decision block 618. In the decision block 618, the microprocessor 212 checks an internal timer to determine whether the cycle time for the present transmit pulse is complete. In the preferred embodiment, the cycle time is approximately 2.5 ms. One skilled in the art will recognize that an appropriate cycle time can be determined from various factors such as government regulation of devices that emit electromagnetic radiation and a need to conserve battery power.

If the cycle time is not complete, the microprocessor 212 returns to the decision block 616. The microprocessor continues to loop through the decision blocks 616 and 618 until either a receive pulse is detected, or the cycle time is complete. If no receive pulse is detected in block 616, and the decision block 618 determines that the cycle time is complete, then microprocessor 212 advances to a process block 634. At this point the transmit pulse was sent, but a return pulse was not received. Thus, the distance-measurement cycle is complete, but no current data value has been obtained.

Alternatively, if a receive pulse is detected at the decision block 616, the microprocessor 212 advances to a process block 622. At the process block 622, the microprocessor 212 reads the digital representation of the sampled voltage either on the digital data lines 272A to 272N or from the microprocessor's internal counter. This completes the present distance-measurement cycle. With the microprocessor 212 having obtained a current data value the microprocessor 212 advances to a decision block 626.

In an alternate embodiment, as part of the process block 622, the microprocessor 212 may cause the viewfinder light 124 to start blinking to indicate that the presence of the receive pulse. In yet another alternate embodiment, microprocessor 212 may vary the duty cycle or the blinking rate of the viewfinder light 124 to indicate the strength, quality, or quantity of the receive pulses. This advantageously provides a way to indicate the accuracy of a final result displayed on the range display 114.

At the decision block 626, the microprocessor 212 determines whether the last data value for the current distance-measurement operation has been obtained. As indicated above, in the preferred embodiment, the last data value is the sixty-fourth data value.

If the last data value has not been obtained, the microprocessor 212 advances to a process block 628. At the process block 628, the microprocessor 212 waits until an internal timer indicates that the cycle time has been completed. When the cycle time is complete, the microprocessor 212 advances to the process block 614.

If the last data value has been obtained at the decision block 626, the microprocessor 212 advances to a process block 632. At this point, the microprocessor 212 has obtained all of the required data values and can proceed to accurately calculate the distance between the distance-measurement apparatus 100 and the remote object or surface. To complete the process block 632, the microprocessor 212 generates appropriate electronic signals on the range display bus 276 to cause the range display 114 to display the resulting distance measurement. The microprocessor 212 maintains the display of the distance-measurement result for approximately 5 seconds.

Advancing to the process block 634, the microprocessor 212 turns off the viewfinder light 124 to indicate to the user that the measurement is completed. Advancing to a process block 636, the microprocessor 212 discards any previously obtained data, checks the voltage level provided by the power supply 222, and momentarily illuminates the low-battery indicator 142 if the voltage level is too low. Next the microprocessor 212 controls the power supply 222 using the analog power control line 278 to disable power on the analog power line 294 to power down the time measurement circuit 162 or 302, the light transmitter unit 224 and the photodiode unit 226. After the process block 636, the microprocessor 212 returns to the process block 604.

In summary, in the method of FIG. 13, the microprocessor 212 enters a sleep mode when the distance-measurement apparatus 100 is not performing a distance-measurement operation. A distance-measurement operation generally comprises the steps of discharging the charging capacitor 208 or 308, generating a pulse of light at the laser diode 120, beginning to charge the charging capacitor 208 or 308, detecting whether a reflected light pulse has been received at the photodiode receiver 118, and converting the accumulated voltage across the charging capacitor 208 or 308 to a digital value upon reception of a reflected light pulse. When a predetermined number of digital values have been obtained, the microprocessor 212 computes a distance-measurement value, and displays the distance-measurement value on the range display 114.

A person of skill in the art will understand that the specific embodiments of the advanced viewfinder described above can be altered without effectively changing the method of the enhanced viewfinding system.

What is claimed is:

1. A hand-held, distance-measurement apparatus comprising:
   an image source which generates an image;
   an optical system comprising a viewfinder which is configured to provide a field-of-view, said optical system further configured to superimpose said image from said image source upon said field-of-view, said viewfinder having a line of sight through said superimposed image which targets a remote surface displayed in said field-of-view; and
   a distance-measurement system which is configured to operate in at least a first operational mode and a second operational mode to obtain a distance measurement of said remote surface, said first operational mode configured to activate sad image source and prevent said distance measurement while a user targets said remote surface, said second operational mode configured to obtain said distance measurement of said remote surface.

2. The apparatus of claim 1 wherein in said second operational mode, said distance-measurement system further comprises an electromagnetic radiation generator -\*\*which emits electromagnetic radiation in the direction of said remote surface and receives a reflection portion of said radiation from said remote surface to provide a distance value representing the distance between said distance-measurement apparatus and said remote surface.

3. The apparatus of claim 2 wherein said distance-measurement system further comprises:
   time-measurement circuitry which measures the elapsed time between the generation of said electromagnetic radiation and the reception of said reflected portion of said radiation off said remote surface, said time-measurement circuitry further configured to generate a digital value which is substantially proportional to said elapsed time; and
   a microprocessor which processes a plurality of digital values from said time-measurement circuitry to determine said distance measurement.

4. The apparatus of claim 3, wherein said microprocessor discards at least some of the highest values of said plurality of digital values and wherein said microprocessor determines said distance measurement by processing digital values which have not been discarded.

5. The apparatus of claim 3, wherein said microprocessor averages at least some of said plurality of digital values to determine said distance measurement.

6. The apparatus of claim 1 wherein said first operational mode and said second operational mode are activated in response to a switch.

7. The apparatus of claim 1 wherein said superimposed image flashes in said second mode of operation.

8. The apparatus of claim 1 wherein said distance measurement is displayed in a range display.

9. The apparatus of claim 1 wherein said image source is disabled in said second operational mode.

10. The apparatus of claim 1 wherein said image source is turned off in said second operational mode after a predetermined period of time.

11. The apparatus of claim 1 wherein said image source is a light emitting diode.

12. The apparatus of claim 1 wherein said superimposed image is a colored dot.

13. The apparatus of claim 1 wherein said superimposed image is a red dot.

14. The apparatus of claim 6 wherein said optical system is further configured to reflect said image off of a partially reflecting mirror and onto said field of-view.

15. The method of obtaining the distance of a remote surface comprising the steps of:
   placing a distance measurement device in a first mode of operation which superimposes an image upon a viewfinder field-of-view, said field-of-view having a line of sight through said superimposed image;
   positioning said viewfinder such that said superimposed image targets a remote surface while preventing a distance measurement; and
   placing said distance measurement device in a second mode of operation; and
   obtaining a distance value which represents the distance between said distance-measurement device and said remote surface.

16. The method of claim 15 wherein said step of generating said image comprises activating a light emitting diode.

17. The method of claim 15 wherein said step of superimposing said image comprises reflecting said image onto said field-of-view.

18. The method of claim 15 wherein said superimposed image is a colored dot.

19. The method of claim 15 wherein said superimposed image is a red dot.

20. The method of claim 15 further comprising the step of selecting a switch to place said distance measurement device in said first operational mode.

21. The method of claim 20 further comprising the step of releasing said switch to place said distance measurement device in said second operational mode.

22. The method of claim 15 further comprising the step of displaying said distance measurement on a range display.

23. A method of determining the distance between a distance-measurement apparatus and a remote surface, said method comprising the steps of:
   targeting a remote surface by superimposing an image on a viewfinder while preventing a distance measurement operation; and
   altering the operation mode to perform said distance measurement of said remote surface by:
      performing a plurality of distance measurements by emitting electromagnetic radiation in the direction of said remote surface targeted by said superimposed image in said viewfinder and receiving a reflected portion of said electromagnetic radiation; and computing a distance value from said plurality of distance measurements, said distance value representing the distance between said distance-measurement apparatus and said remote surface.

24. The method of claim 23 said step of performing a plurality of distance measurements generates a plurality of digital values which represent the elapsed time between the generation of said electromagnetic radiation and the receiving of said reflected portion of said electromagnetic radiation.

25. The method of claim 24 wherein said step of computing a distance value discards at least some of said plurality of digital values, wherein some of said discarded digital values have the highest numerical values and processing digital values which have not been discarded.

26. The method of claim 23 wherein said activation request comprises pushing a button.

27. The method of claim 23 wherein said measurement request comprises releasing said button.

28. The method of claim 23 wherein said step of superimposing said image in said viewfinder comprises turning on a light which is visible to a user looking through said viewfinder.

* * * * *

UNITED STATES PATENT AND TRADEMARK OFFICE
CERTIFICATE OF CORRECTION

PATENT NO.   : 5,898,484
DATED        : April 27, 1999
INVENTOR(S)  : Steven E. Harris It is certified that error appears in the above-identified patent and that said Letters Patent is hereby corrected as shown below:

Column 27,
Line 37, please replace "sad" with -- said --.
Line 45, please replace "generator -** which" with -- generator which --.

Signed and Sealed this

Thirtieth Day of April, 2002

Attest:

Attesting Officer

JAMES E. ROGAN
Director of the United States Patent and Trademark Office